(12) United States Patent
Aksyuk et al.

(10) Patent No.: US 10,247,860 B2
(45) Date of Patent: Apr. 2, 2019

(54) LOCALIZED GAP PLASMON RESONATOR

(71) Applicant: THE UNITED STATES OF AMERICA, AS REPRESENTED BY THE SECRETARY OF COMMERCE, Washington, DC (US)

(72) Inventors: Vladimir A. Aksyuk, Gaithersburg, MD (US); Brian J. Roxworthy, Chevy Chase, MD (US); J. Alexander Liddle, Gaithersburg, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 249 days.

(21) Appl. No.: 15/423,510

(22) Filed: Feb. 2, 2017

(65) Prior Publication Data

US 2017/0242163 A1 Aug. 24, 2017

Related U.S. Application Data

(60) Provisional application No. 62/298,007, filed on Feb. 22, 2016.

(51) Int. Cl.
*G02B 1/00* (2006.01)
*G02B 5/00* (2006.01)
(Continued)

(52) U.S. Cl.
CPC .............. *G02B 5/008* (2013.01); *G02B 1/002* (2013.01); *B82Y 20/00* (2013.01); *B82Y 30/00* (2013.01);
(Continued)

(58) Field of Classification Search
CPC ................................................. Y10S 977/732
See application file for complete search history.

(56) References Cited

U.S. PATENT DOCUMENTS

| 6,384,953 | B1 * | 5/2002 | Russell | ..................... | G01J 3/26 |
| | | | | | 359/245 |
| 7,456,383 | B2 * | 11/2008 | Kim | ..................... | G01J 3/0259 |
| | | | | | 250/208.1 |

(Continued)

OTHER PUBLICATIONS

A. Sugita, H. Yogo, A. Ono and Y. Kawata, "Polarized SHG spectroscopy for three-fold rotationally symmetric Au triangular nanoprism at LSP resonances," 2017 Conference on Lasers and Electro-Optics (CLEO), San Jose, CA, 2017, pp. 1-1. (Year: 2017).*

(Continued)

*Primary Examiner* — Rhonda S Peace
(74) *Attorney, Agent, or Firm* — Office of Chief Counsel for National Institute of Standards and Technology

(57) ABSTRACT

A localized gap plasmon resonator includes: a pad including: a first plasmonic material to support a surface plasmon; and a first plasmon surface; a nanoelectromechanical (NEM) member disposed opposing the first plasmon surface of the pad and spaced apart from the pad by a plasmon gap, the plasmon gap supporting a plasmon resonance; and a plasmonic nanoprism disposed on the NEM member and including: a second plasmonic material to support a surface plasmon; and a second plasmon surface, such that: the second plasmon surface of the plasmonic nanoprism opposes the first plasmon surface of the pad; and the pad, the plasmonic nanoprism, and the plasmon gap support a localized gap plasmon (LGP) mode.

19 Claims, 20 Drawing Sheets

(51) Int. Cl.
*B82Y 20/00* (2011.01)
*B82Y 30/00* (2011.01)
*B82Y 40/00* (2011.01)

(52) U.S. Cl.
CPC ............ *B82Y 40/00* (2013.01); *Y10S 977/732* (2013.01); *Y10S 977/882* (2013.01); *Y10S 977/932* (2013.01)

(56) References Cited

U.S. PATENT DOCUMENTS

| | | | |
|---|---|---|---|
| 9,627,114 B2* | 4/2017 | Akselrod | H01F 1/0045 |
| 9,777,372 B2* | 10/2017 | Oh | C23C 16/45525 |
| 2009/0101815 A1* | 4/2009 | Ohtsuka | B82Y 20/00 |
| | | | 250/307 |
| 2017/0076843 A1* | 3/2017 | Akselrod | H01F 1/0045 |
| 2017/0242163 A1* | 8/2017 | Aksyuk, IV | G02B 5/008 |
| 2017/0299784 A1* | 10/2017 | Mikkelsen | H01L 33/26 |

OTHER PUBLICATIONS

V. Varyshchuk, T. Bulavinets, I. Yaremchuk and Y. Bobitski, "The shape effect on the optical properties of metallic nanoparticles," 2018 14th International Conference on Advanced Trends in Radioelecrtronics, Telecommunications and Computer Engineering (TCSET), Lviv-Slayske, 2018, pp. 458-461. (Year: 2018).*
Thijssen, R., et al., Plasmomechanical resonators based on dimer nanoantennas, Nano Letters, 2015, 3971-3976, 15.

* cited by examiner

100

(A)

100

(B)

100

(A)

100

(B)

(A)

(B)

LOCALIZED GAP PLASMON RESONATOR

CROSS REFERENCE TO RELATED APPLICATIONS

This application claims the benefit of U.S. Provisional Patent Application Ser. No. 62/298,007, filed Feb. 22, 2016, the disclosure of which is incorporated herein by reference in its entirety.

STATEMENT REGARDING FEDERALLY SPONSORED RESEARCH

This invention was made with United States Government support from the National Institute of Standards and Technology. The Government has certain rights in the invention.

BRIEF DESCRIPTION

Disclosed is a localized gap plasmon resonator comprising: a pad comprising: a first plasmonic material to support a surface plasmon; and a first plasmon surface; a nanoelectromechanical (NEM) member disposed opposing the first plasmon surface of the pad and spaced apart from the pad by a plasmon gap, the plasmon gap supporting a plasmon resonance; and a plasmonic nanoprism disposed on the NEM member and comprising: a second plasmonic material to support a surface plasmon; and a second plasmon surface, such that: the second plasmon surface of the plasmonic nanoprism opposes the first plasmon surface of the pad; the second plasmon surface is parallel to the first plasmon surface; a distance that separates the second plasmon surface from the first plasmon surface is a size of the plasmon gap between the second plasmon surface and the first plasmon surface; and the pad, the plasmonic nanoprism, and the plasmon gap support a localized gap plasmon (LGP) mode comprising an LGP frequency.

Also disclosed is a localized gap plasmon resonator comprising: a pad comprising: a first plasmonic material to support a surface plasmon; and a first plasmon surface; a plasmonic nanoprism disposed on the pad and comprising: a second plasmonic material to support a surface plasmon; and a second plasmon surface, such that: the second plasmon surface of the plasmonic nanoprism opposes the first plasmon surface of the pad; the second plasmon surface is parallel to the first plasmon surface; the second plasmon surface is spaced apart from the first plasmon surface by a plasmon gap, wherein a distance that separates the second plasmon surface from the first plasmon surface is a size of the plasmon gap between the second plasmon surface and the first plasmon surface; and the pad, the plasmonic nanoprism, and the plasmon gap support a localized gap plasmon (LGP) mode comprising an LGP frequency; and a dielectric spacer disposed in the plasmon gap and interposed between the pad and the plasmonic nanoprism.

Further disclosed is a process for making the localized gap plasmon resonator, the process comprising: providing a pad layer; disposing a sacrificial layer on the pad layer; removing a portion of the sacrificial layer and a portion of the pad layer; forming the pad from the pad layer, wherein a remaining portion of the sacrificial layer is disposed on the first plasmon surface of the pad; disposing the plasmonic nanoprism on the sacrificial layer, such that the sacrificial layer is interposed between the second surface of the plasmonic nanoprism and the first plasmon surface of the pad; disposing a device layer on the plasmonic nanoprism; and removing the sacrificial layer interposed between the pad and the plasmonic nanoprism to make the localized gap plasmon resonator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a localized gap plasmon resonator herein provides detection of motion of a sub-picogram cantilever or beam of the localized gap plasmon resonator with an unexpectedly high sensitivity and small footprint. Moreover, the localized gap plasmon resonator has a low level of input-referred mechanical motion noise that results from the unique optomechanical properties of the localized gap plasmon resonator, including a combination of extremely large optomechanical coupling strength, high plasmonic quality factor, and a large optical cross section of the localized gap plasmon resonator. Beneficially, an increase in modulation of a reflected signal is provided by a small motion of the localized gap plasmon resonator. A broadband nature of a localized gap plasmon (LGP) mode provides benefits for chip-scale motion detection applications. It is contemplated that motion can be transduced from multiple localized gap plasmon resonators, including an array of localized gap plasmon resonators that simultaneously use a single optical wavelength or a common wavelength range for optical detection regardless of a presence of a fabrication variation that can introduce device-to-device variation in a wavelength of the LGP mode.

Figure 1:
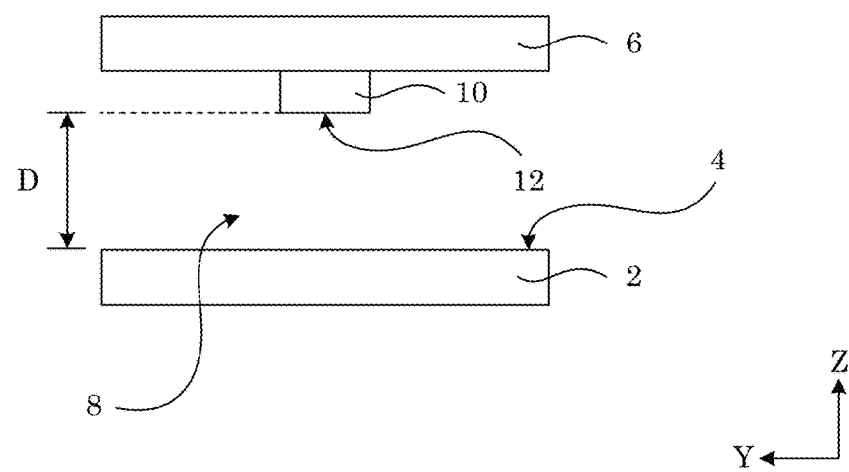
FIG. 1 shows a localized gap plasmon resonator in which panel A is a cross-sectional view, and panel B is a perspective view.
Figure 1:
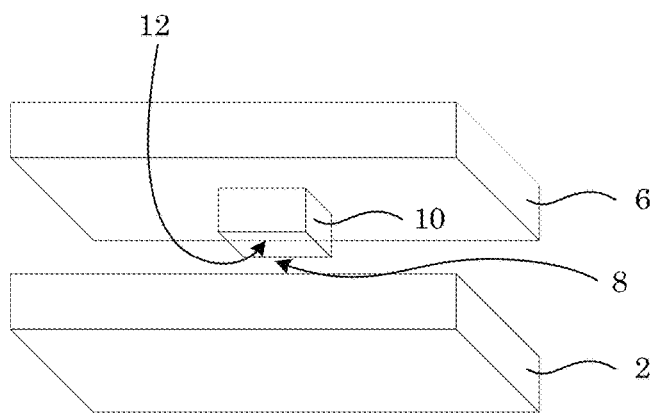
Figure 1:
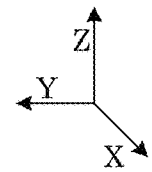

In an embodiment, with reference to FIG. 1 (panel A: cross-sectional view; panel B: perspective view), localized gap plasmon resonator 100 includes pad 2 that includes first plasmon surface 4; nanoelectromechanical (NEM) member 6 disposed opposing first plasmon surface 4 of pad 2 and spaced apart from pad 2 by plasmon gap 8; and plasmonic nanoprism 10 disposed on NEM member 6. Plasmonic nanoprism 10 includes second plasmon surface 12. Here, second plasmon surface 12 of plasmonic nanoprism 10 opposes first plasmon surface 4 of pad 2 such that second plasmon surface 12 is parallel to first plasmon surface 4. Distance D that separates second plasmon surface 12 from first plasmon surface 4 is a size of plasmon gap 8 between second plasmon surface 12 and first plasmon surface 4. Moreover, pad 2, plasmonic nanoprism 10, and plasmon gap 8 support a localized gap plasmon (LGP) mode comprising an LGP frequency, an intrinsic optical loss rate and an optical loss rate by radiation.

Figure 2:
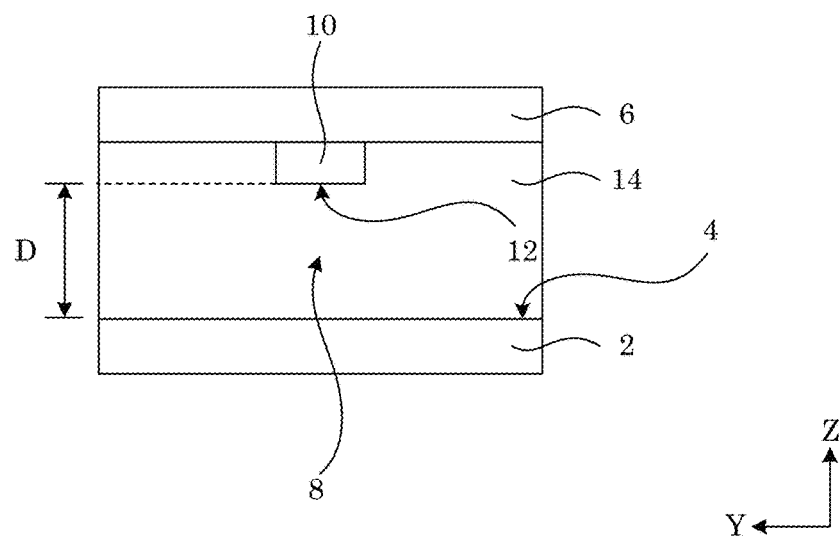
FIG. 2 shows a localized gap plasmon resonator in which panel A is a cross-sectional view, and panel B is a perspective view.
Figure 2:
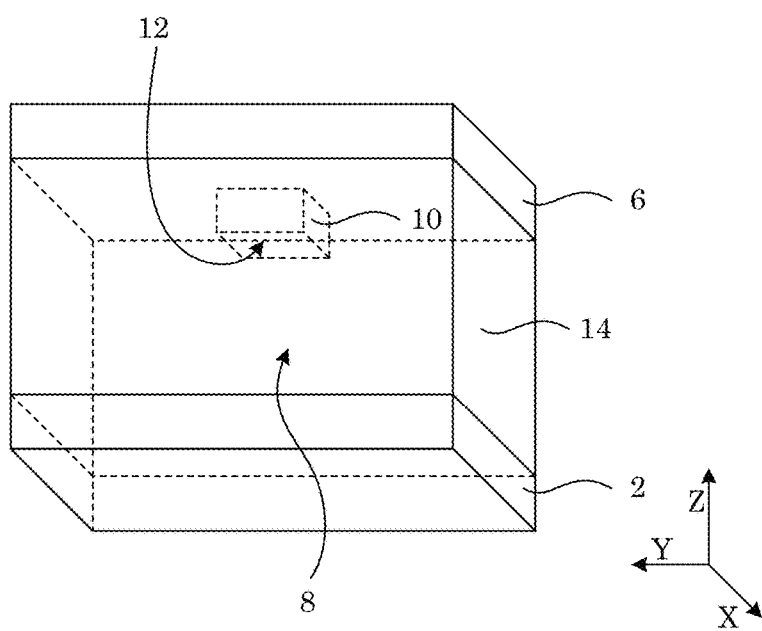
Figure 3:
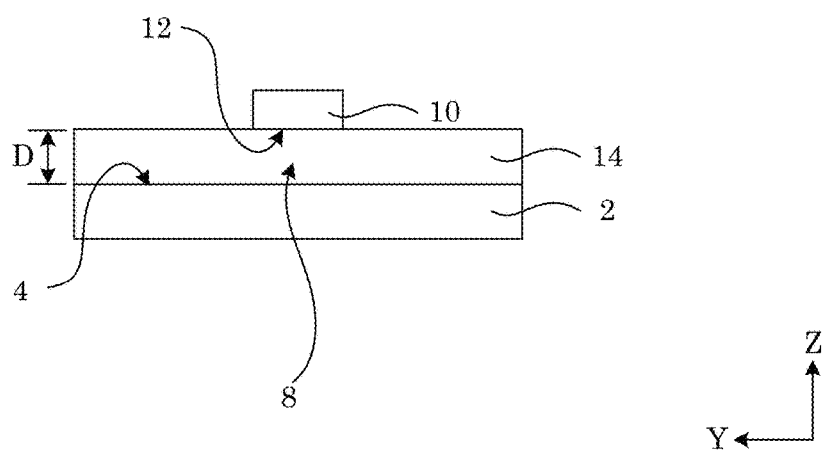
FIG. 3 shows a localized gap plasmon resonator in which panel A is a cross-sectional view, and panel B is a perspective view.
Figure 3:
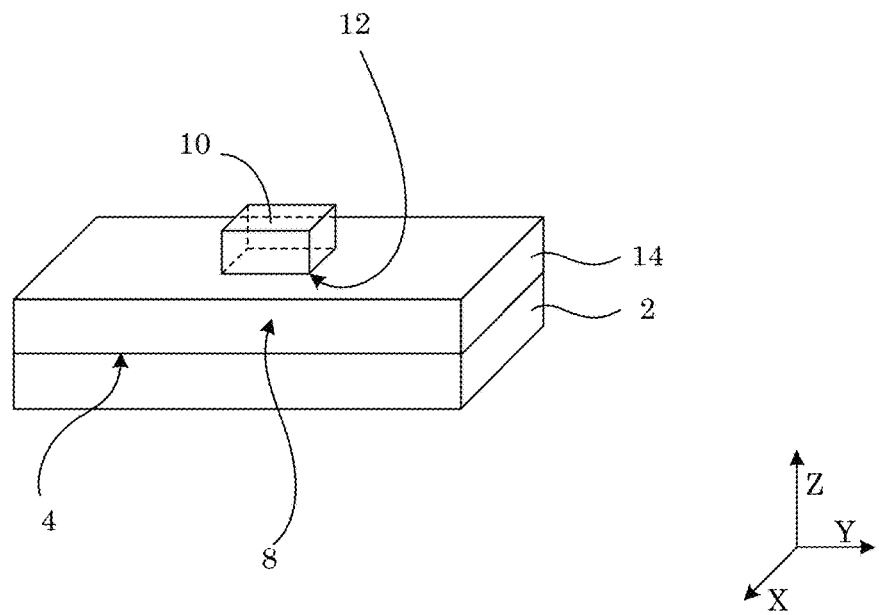

In an embodiment, with reference to FIG. 2 and FIG. 3, dielectric spacer 14 is disposed in plasmon gap 8 and interposed between pad 2 and plasmonic nanoprism 10. It should be appreciated that NEM member 6 is present in the embodiment shown in FIG. 2 and absent in the embodiment shown in FIG. 3.

According to an embodiment, with reference to FIG. 3, localized gap plasmon resonator 100 includes: pad 2 including: first plasmonic material to support a surface plasmon and first plasmon surface 4; plasmonic nanoprism 10 disposed on pad 2 and including: second plasmonic material to support a surface plasmon and second plasmon surface 12, such that: second plasmon surface 12 of plasmonic nanoprism 10 opposes first plasmon surface 4 of pad 2, second plasmon surface 12 is parallel to first plasmon surface 4, second plasmon surface 12 is spaced apart from first plasmon surface 4 by plasmon gap 8, wherein a distance that separates second plasmon surface 12 from first plasmon surface 4 is a size of plasmon gap 8 between second plasmon surface 12 and first plasmon surface 4; and pad 2, plasmonic nanoprism 10, and plasmon gap 8 support LGP mode including an LGP frequency, an intrinsic optical loss rate and an optical loss rate by radiation; and dielectric spacer 14 disposed in plasmon gap 8 and interposed between pad 2 and plasmonic nanoprism 10.

Figure 4:
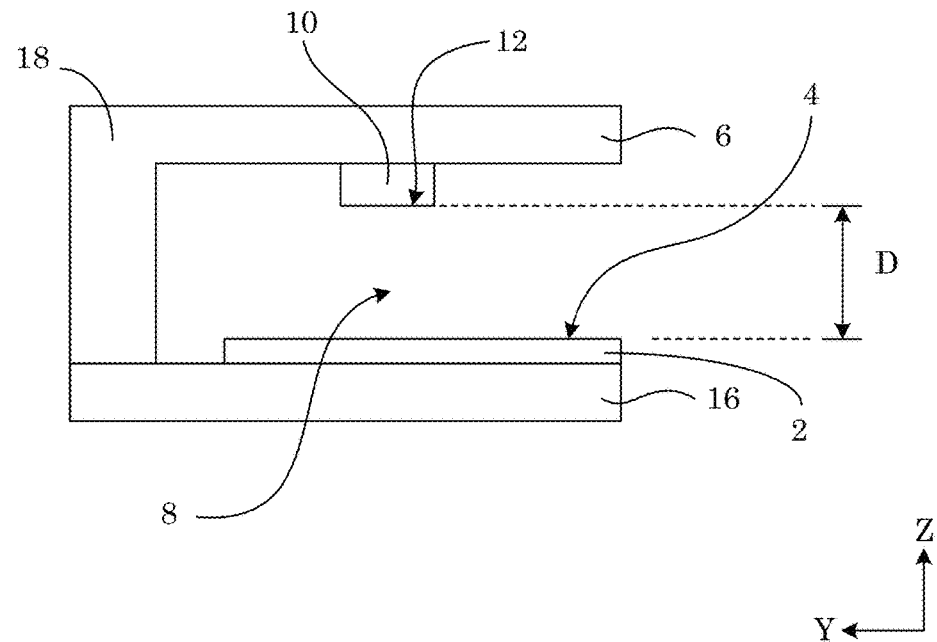
FIG. 4 shows a localized gap plasmon resonator in which panel A is a cross-sectional view, and panel B is a perspective view.
Figure 4:
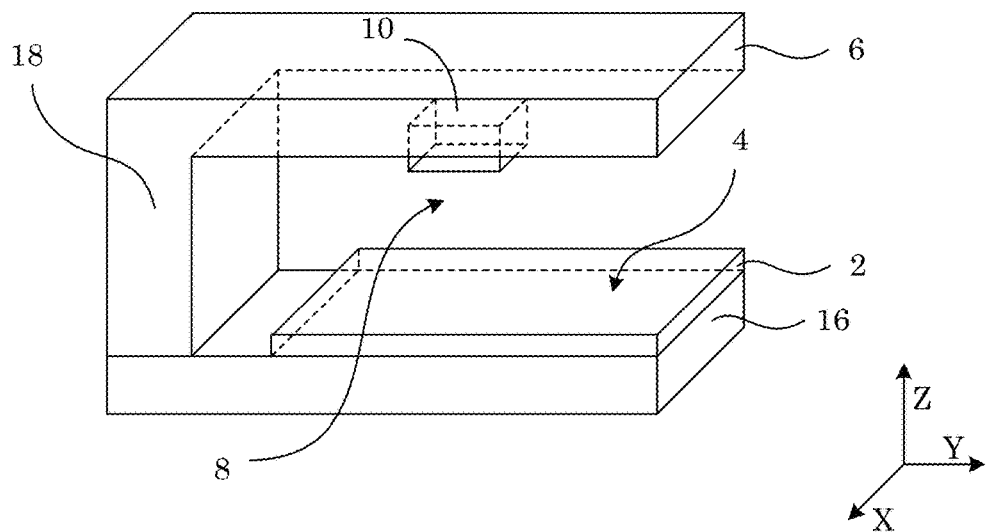

In an embodiment, with reference to FIG. 4, localized gap plasmon resonator 100 includes NEM member 6 that is a cantilever in mechanical communication with substrate 16. Here, pad 2 is disposed on substrate 16. Attachment point 18 connects cantilever 6 to substrate 16. Plasmonic nanoprism 10 is disposed on cantilever 6 such that plasmon gap 8 is interposed between second plasmon surface 12 of plasmonic nanoprism 10 and first plasmon surface 4 of pad 2. In this manner, when cantilever 6 moves relative to pad 2, distance D changes and produces a change in the LGP frequency, intrinsic optical loss rate, optical loss rate by radiation, or a combination thereof of the LGP mode supported by pad 2 and plasmonic nanoprism 10.

Figure 5:
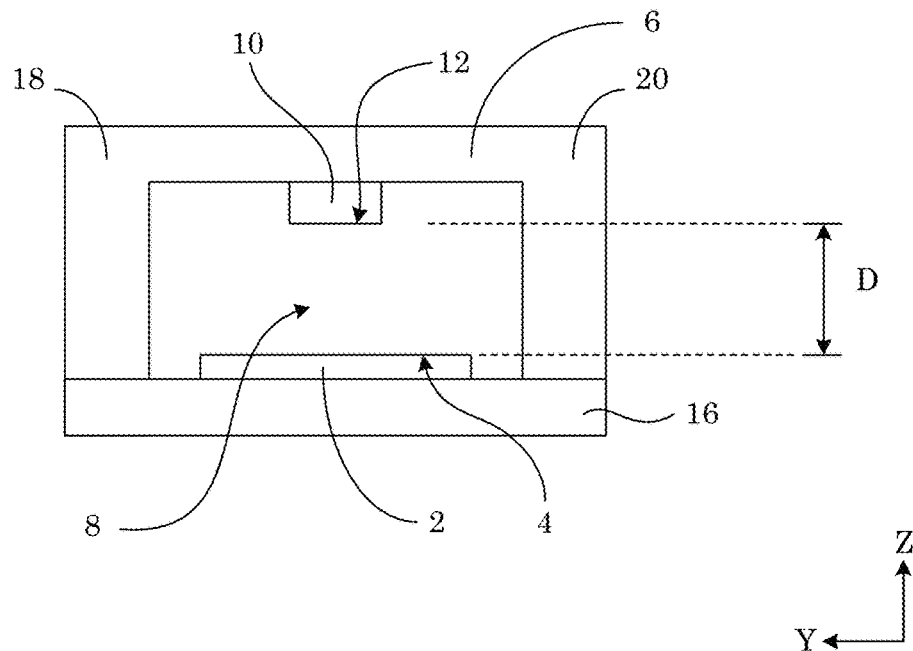
FIG. 5 shows a localized gap plasmon resonator in which panel A is a cross-sectional view, and panel B is a perspective view.
Figure 5:
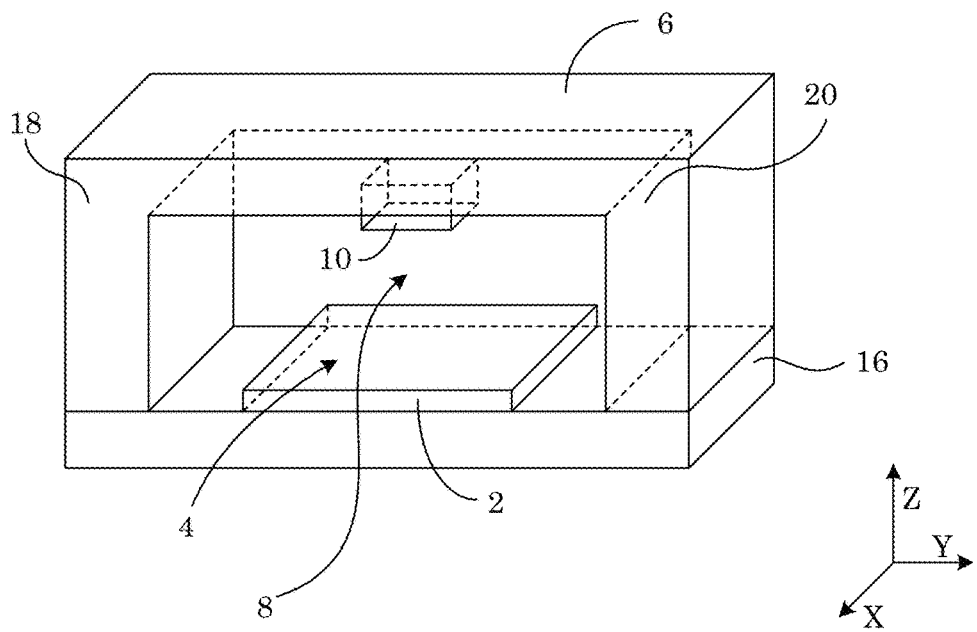

In an embodiment, with reference to FIG. 5 localized gap plasmon resonator 100 includes NEM member 6 that is a beam in mechanical communication with substrate 16. Here, pad 2 is disposed on substrate 16. Attachment points (18, 20) connect beam 6 to substrate 16. Plasmonic nanoprism 10 is disposed on beam 6 such that plasmon gap 8 is interposed between second plasmon surface 12 of plasmonic nanoprism 10 and first plasmon surface 4 of pad 2. In this manner, when beam 6 moves relative to pad 2, distance D changes which produces a change in the LGP frequency, intrinsic optical loss rate, optical loss rate by radiation, or a combination thereof of the LGP mode supported by pad 2 and plasmonic nanoprism 10. It is contemplated that a plurality of attachment points (e.g., 18 and 20) connects beam 6 to substrate 16 but not limited to two points of attachment. Here, beam 6 is connected to substrate 16 at a first end of beam 6 and a second end of beam 6 at points of attachment 18 and 20, respectively. The number of points of attachment can be greater than two.

Localized gap plasmon resonator 100 includes pad 2 to produce the LGP mode in combination with plasmonic nanoprism 10. Pad 2 includes the first plasmonic material to support a surface plasmon. The plasmonic material can include gold, silver, aluminum, copper, other metal, metal alloy, heavily doped semiconductor, graphene, other material exhibiting collective oscillations of free charges and/or exhibiting negative real permittivity, or a combination thereof. In an embodiment, the first plasmonic material is gold.

A size of pad 2 can be selected to provide the LGP mode. Pad 2 can have a thickness, width, and length that independently are from 1 nanometer (nm) to 100 centimeters (cm), specifically from 1 nm to 50 mm, and more specifically from 10 nm to 10 micrometers (μm).

A shape of pad 2 is selected to provide the LGP mode. Exemplary shapes include cuboid, cylinder, prism or another shape with at least one planar surface of any shape. Moreover, first plasmon surface 4 can be planar in a location proximate to plasmon gap 8.

In localized gap plasmon resonator 100, plasmonic nanoprism 10 includes second plasmonic material to support a surface plasmon and to support LGP mode with LGP frequency, intrinsic optical loss rate, or optical loss rate by radiation, in combination with pad 2. The plasmonic material can include gold, silver, aluminum, copper, other metal, metal alloy, heavily doped semiconductor, graphene, other material exhibiting collective oscillations of free charges and/or exhibiting negative real permittivity, or a combination thereof. In an embodiment, the second plasmonic material is gold.

A size of plasmonic nanoprism 10 can be selected to provide the LGP mode. Plasmonic nanoprism 10 can have a thickness, width, and length that independently are from 1 nanometer (nm) to 100 centimeters (cm), specifically from 1 nm to 50 mm, and more specifically from 10 nm to 10 micrometers (μm). In an embodiment, the thickness, width, and length of plasmonic nanoprism 10 independently are less than or equal to 350 nm.

A shape of plasmonic nanoprism 10 is selected to provide the LGP mode. Exemplary shapes include cuboid, cylinder, prism or another shape with at least one planar surface of any shape. The shape of plasmonic nanoprism 10 can be a cuboid. In an embodiment, the cuboid comprises a rectangular nanoprism. Moreover, second plasmon surface 12 can be planar in a location proximate to plasmon gap 8.

It is contemplated that the first plasmonic material and the second plasmonic material independently comprise gold, silver, aluminum, copper, other metal, metal alloy, heavily doped semiconductor, graphene, other material exhibiting collective oscillations of free charges and/or exhibiting negative real permittivity or a combination thereof. In a certain embodiment, the first plasmonic material and the second plasmonic material are gold.

Plasmon gap 8 is interposed between second plasmon surface 12 of plasmonic nanoprism 10 and first plasmon surface 4 of pad 2, wherein the size of plasmon gap 8 (shown as distance D, e.g., in FIG. 1, can be from 1 nm to 50 nm, specifically from 1 nm to 25 nm, and more specifically from 1 nm to 15 nm. Distance D changes in response to movement of NEM member 6 relative to first plasmon surface 4 of pad 2. In this manner, the LGP frequency, intrinsic optical loss rate, optical loss rate by radiation, or a combination thereof changes. A plasmonic nanoprism 10 and pad 2 can simultaneously support a plurality of different LGP modes at an arbitrary spacing. The LGP frequency, intrinsic optical loss rate, optical loss rate by radiation, or a combination thereof can have a different spacing (i.e., different distance D) between plasmonic nanoprism 10 and pad 2.

NEM member 6 can be disposed in localized gap plasmon resonator 100 and can have plasmonic nanoprism 10 disposed thereon. It is contemplated that NEM member 6 supports plasmonic nanoprism 10 at distance D from pad 2 to provide plasmon gap 8. NEM member 6 can include an element from group 2, group 3, group 5, group 6, group 10, group 11, group 12, group 13, group 14, group 15, group 16, or a combination of the foregoing elements from the periodic table of elements. In an embodiment, NEM member 6 includes silicon nitride, silicon, gold, aluminum, silicon dioxide, gallium arsenide, indium phosphide, silicon germanium, or a combination thereof. In a certain embodiment, NEM member 6 includes silicon nitride.

NEM member 6 can have a thickness, width, and length that independently are from 1 nanometer (nm) to 100 centimeters (cm), specifically from 1 nm to 50 mm, and more specifically from 100 nm to 500 micrometers (μm). In an embodiment, the thickness, width, and length of NEM member 6 independently are less than or equal to 10 micrometers (μm).

A shape of NEM member 6 can include beam, cantilever, curved beam, curved cantilever, plate, rectangular plate, square plate, circular plate, drumhead, membrane, rectangular membrane square membrane, circular membrane, and the like. The shape of NEM member 6 can be a cantilever.

Dielectric spacer 14 can be interposed between plasmonic nanoprism 10 and pads 2 and disposed in plasmon gap 8. Dielectric spacer 14 is compliant to the size or shape of plasmon gap 8 between second plasmon surface 12 and first plasmon surface 4 such that a thickness of dielectric spacer 14 changes in response to a change in the size of plasmon gap 8 between second plasmon surface 12 and first plasmon surface 4.

Dielectric spacer 14 can include a material that supports the LGP mode. Exemplary materials for dielectric spacer 14 include a polymer, a fluid, a gas, or a combination thereof. Polymers include polycarbonate, polypropylene, polyepoxide, polyethylene, polymethyl methacrylate, polydimethylsiloxane, or a combination thereof. In an embodiment, the polymer is epoxy.

Dielectric spacer 14 can have a thickness, width, and length that independently are from 1 nanometer (nm) to 100 centimeters (cm), specifically from 1 nm to 50 mm, and more specifically from 10 nm to 10 micrometers (μm). In an embodiment, the thickness, width, and length of dielectric spacer 14 independently are less than or equal to 500 nm.

In an embodiment, localized gap plasmon resonator 100 includes substrate 16. Exemplary materials for substrate 16 include a semiconductor, a dielectric, a glass, or a combination thereof. The semiconductor can include silicon, silicon carbide, or a combination thereof. Dielectrics include diamond, aluminum oxide, or a combination thereof. In an embodiment, substrate 16 is silicon.

Substrate 16 can have a thickness, width, and length that independently are from 1 nanometer (nm) to 100 centimeters (cm), specifically from 1 nm to 50 mm, and more specifically from 1000 nm to 1 mm. In an embodiment, the thickness, width, and length of substrate independently are less than or equal to 1 cm.

Figure 7:
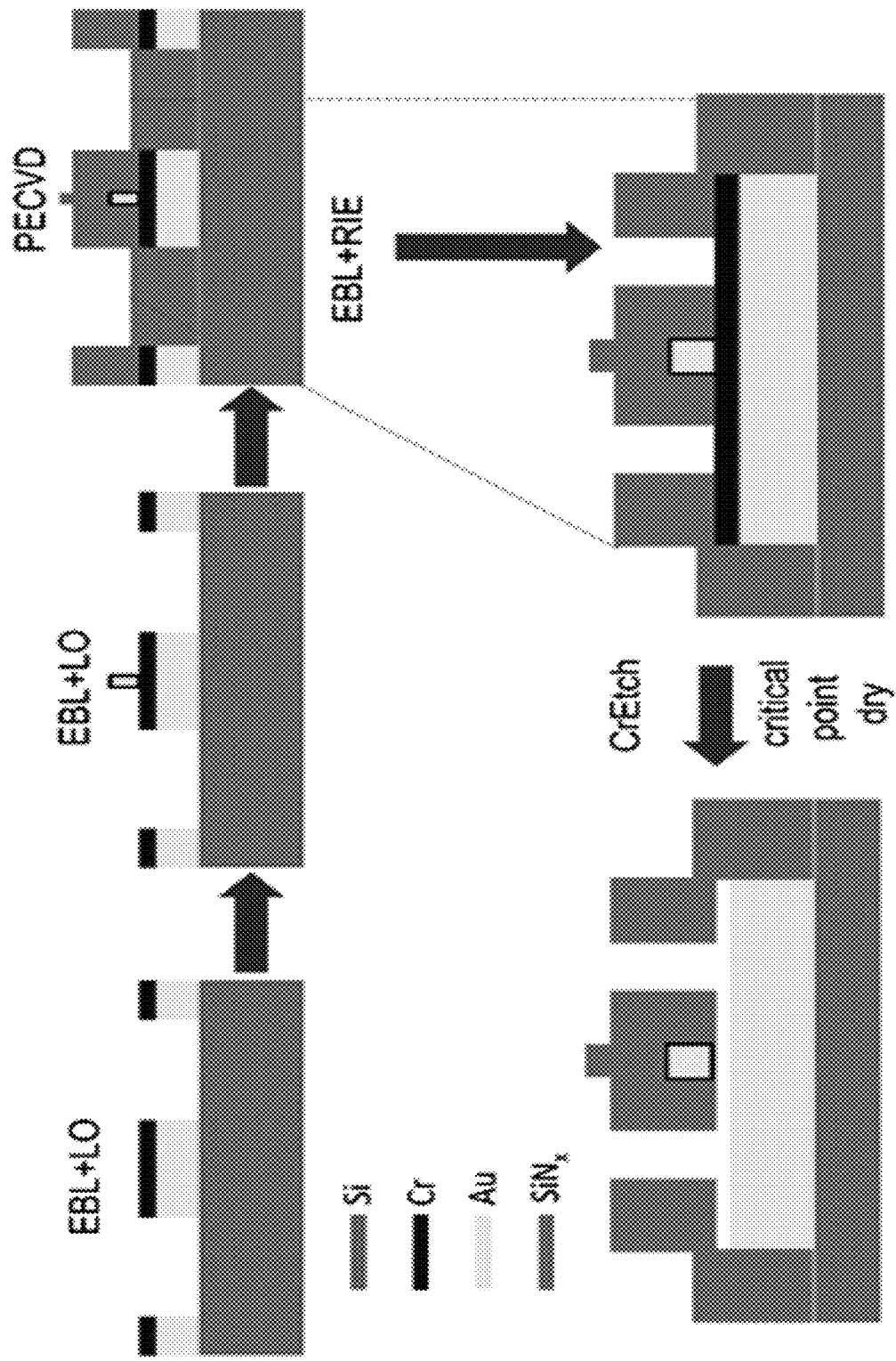
FIG. 7 shows steps involved in a process to make a localized gap plasmon resonator, wherein EBL is electron beam lithography, LO is lift off, PECVD is plasma-enhanced chemical vapor deposition, RIE is reactive-ion etching.

In an embodiment, e.g., with reference to FIG. 7, a process for making localized gap plasmon resonator 100 includes: providing a pad layer; disposing a sacrificial layer on the pad layer; removing a portion of the sacrificial layer and a portion of the pad layer; forming pad 2 from the pad layer, wherein a remaining portion of the sacrificial layer is disposed on first plasmon surface 4 of pad 2; disposing plasmonic nanoprism 10 on the sacrificial layer such that the sacrificial layer is interposed between second plasmon surface 12 of plasmonic nanoprism 10 and first plasmon surface 4 of pad 2; disposing a device layer on plasmonic nanoprism 10; and removing the sacrificial layer interposed between pad 2 and plasmonic nanoprism 10 to make localized gap plasmon resonator 100. Here, the sacrificial layer can be chromium.

In certain embodiments, NEM member 6 is absent in localized gap plasmon resonator 100. A process for making localized gap plasmon resonator 100 without NEM member 6 includes providing dielectric spacer 14; disposing pad 2 on dielectric spacer 14; disposing plasmonic nanoprism 10 on dielectric spacer 14 to make localized gap plasmon resonator 100. Here, providing dielectric spacer 14 includes slot-die coating, doctor blade coating, Meyer Rod coating, chemical vapor deposition, and physical vapor deposition. Additionally, disposing pad 2 on dielectric spacer 14 is accomplished by providing a substrate layer, disposing a pad layer on the substrate layer, removing part of the pad layer to form pad 2, disposing the dielectric spacer layer on the pad 2 and substrate, forming dielectric spacer 14. Further, disposing plasmonic nanoprism 10 on dielectric spacer 14 includes disposing a nanoprism layer on the dielectric spacer layer and removing portion of the nanoprism layer to form nanoprism 10. In an embodiment portions of the dielectric spacer layer and pad layer are removed after forming the nanoprism layer 10 to form pad 2 and dielectric spacer 14. In an embodiment the substrate is removed after forming the gap plasmon resonator 100.

Localized gap plasmon resonator 100 couples oscillating electromagnetic fields to conduction electrons in plasmonic nanoprism 10 and pad 2 through plasmon gap 8. Moreover, localized gap plasmon resonator 100 can confine optical-frequency excitations at a nanometer scale. This confinement facilitates miniaturization of nanophotonic devices and makes the response of localized gap plasmon resonator 100 highly sensitive to mechanical motion. Accordingly, localized gap plasmon resonator 100 can provide a reconfigurable optic, metasurface, or the like. Here, localized gap plasmon resonator 100 can be used to integrate individual plasmonic structures with precise, nanometer features into tunable mechanical resonators. Localized gap plasmon resonator 100 strongly couples light and mechanical motion within a three-dimensional, sub-diffraction volume, yielding large quality factors and record optomechanical coupling strength, e.g., of 2 terahertz (THz)·nm$^{-1}$. Advantageously and unexpectedly, localized gap plasmon resonator 100 provides sensitive and spatially localized optical transduction of mechanical motion with a low noise floor, e.g., of 6 fm·Hz$^{-1/2}$.

Localized gap plasmon resonator 100 includes a monolithic plasmonic-NEMS (pNEMS) device architecture. In an embodiment, a plurality of localized gap plasmon resonators is embedded into an array of moving silicon nitride nanostructures. The array can include thousands of localized gap plasmon resonators per chip with individually tailorable plasmonic and mechanical designs. Moreover, the array can be formed using optical lithography batch-fabrication and integration with electronics. The LGP resonators produce record optomechanical coupling strengths, e.g., of 2 THz·nm$^{-1}$ and large plasmonic quality factors. The LGP resonators can be used as a nanomechanical sensor, ultrasmall reconfigurable photonic, randomly addressable metamaterial, or the like.

Figure 6:
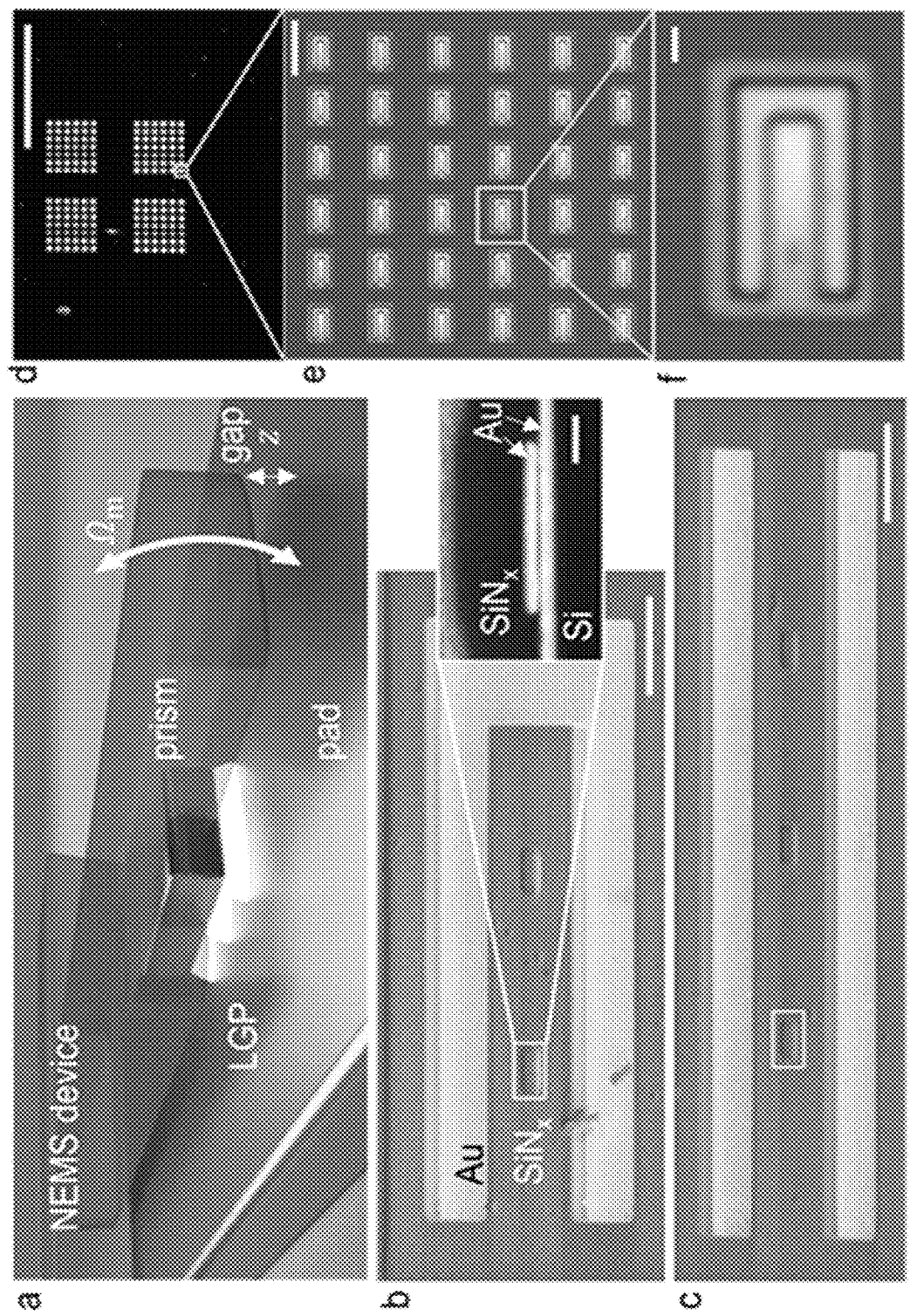
FIG. 6 shows several localized gap plasmon resonators in which panel A shows a perspective view of a localized gap plasmon resonator, wherein fundamental mechanical frequency is $\Omega_m$; panel B shows a false-color scanning electron microscope (SEM) image of a top view of a localized gap plasmon resonator that includes a cantilever, wherein the inset is an image obtained from a focused ion beam of a cross-section of the localized gap plasmon resonator showing a plasmonic nanoprism; panel C shows a false-color SEM image of a localized gap plasmon resonator that includes a beam with a white box surrounding a plasmonic nanoprism that was subjected to analysis, wherein scale bars are 1 µm (inset, 100 nm); panel D shows an optical micrograph of a plurality of localized gap plasmon resonators disposed on a chip with a scale bar of 1 mm; panel E shows a zoomed portion of the plurality of localized gap plasmon resonators shown in panel D, wherein the scale bar is 10 µm; and panel F shows a zoomed portion of the plurality of localized gap plasmon resonator shown in panel E, wherein the scale bar is 1 µm.

In an embodiment, localized gap plasmon resonator 100 includes plasmon gap 8 interposed between plasmonic nanoprism 10 and pad 2 that include respectively, e.g., second plasmon surface 12 and first plasmon surface 4. Here, plasmonic nanoprism 10 and pad 2 can include planar and mutually parallel gold surfaces. Moreover, plasmonic nanoprism 10 can be a rectangular nanoprism (cuboid) opposing pad 2 as shown in FIG. 6. Plasmonic nanoprism 10 is disposed on NEM member 6 and moves with NEM member 6. Two different NEM members 6 were studied, and each NEM member 6 was made of silicon nitride (SiN$_x$). In one study, NEM member 6 was a 5 μm long cantilever disposed in contact with a substrate at one end as the point of attachment as shown in panel B of FIG. 6. In another study, NEM member 6 was an 8 μm long beam that had two points of attachment to the substrate at opposing ends NEM member 6 as shown in panel C of FIG. 6. Plasmonic nanoprism 10 was disposed NEM member 6 such that plasmonic nanoprisms were disposed on at 1.5 μm and 2.0 μm from the base of the cantilever and beam, respectively. An LGP mode formed in the nominally 12 nm plasmon gap under the 35 nm thick plasmonic nanoprism, with footprint for the LGP resonator defined by surface area of the second plasmon surface of the plasmonic nanoprism, which had a 350 nm length and 165 nm width.

With reference to FIG. 7, the LGP resonator was made using repeated steps of aligned electron beam lithography (EBL) exposures. The first exposure uses a 495 k/950 k molecular weight polymethyl methacrylate bilayer resist (100 nm/30 nm thickness, respectively) at a base dosage of 1000 microCoulomb per square centimeter (μC·cm$^{-2}$) to provide chip alignment marks for subsequent layers and pads upon which LGP resonators were formed. After development in a composition that included methyl isobutyl ketone and isopropyl alcohol (1:3 by volume, respectively) for 60 seconds (s), electron beam evaporation was used to deposit a 3 nm Ti adhesion layer, a 45 nm Au pad, and a 12 nm Cr sacrificial layer. Here, the Cr layer roughness was kept to a minimum by depositing at a high rate of 0.3 nm·s$^{-1}$. This method prevents Cr adatom migration and clumping on the Au surface before a continuous film was produced. Thickness of Cr was measured using a crystal balance within the chamber with deposition rate determined by ellipsometry. After liftoff in n-methyl pyrrolidone, plasmonic nanoprisms were formed using EBL and the same bilayer resist with 2000 μC·cm$^{-2}$ base dose, followed by 35 nm Au evaporation and liftoff. Here, the Cr sacrificial layer also provided an adhesion layer for the plasmonic nanoprisms. The device layer was then formed using plasma-enhanced chemical vapor deposition (PECVD) to deposit a low-stress SiN$_x$ layer at 180° C. with a nominal 175 nm thickness. Stress control was provided in the fabrication process in contemplation that residual stress and stress gradient could cause structures to deform away from the substrate. The low net residual compressive stress was approximately 150 megapascals (MPa) as measured on a test wafer using a laser-interferometric stress analyzer. The compressive strength was achieved with radio frequency and inductively coupled plasma power of 50 W and 1100 W, respectively. A final EBL step was used to form the beam of NEM member 6 via an etch mask composed of a 400 nm thick high-resolution electron beam resist. After development for 60 s in room temperature hexyl acetate, the pattern was transferred to the nitride using reactive ion etching with a $CF_4/CHF_3$ (40 $cm^3 \cdot min^{-1}$/5 $cm^3 \cdot min^{-1}$) chemistry and 100 W radio-frequency power. After stripping the remaining resist using an $O_2$ plasma, plasmonic nanoprisms disposed on NEM members were released using an extended (30 minute (min)) wet etch in a solution of ammonium ceric nitrate that completely removed the sacrificial layer and remaining Cr residue. This etchant provided near complete chemical inertness to all materials except Cr. LGP resonators were finalized by an initial soak in isopropyl alcohol followed by critical point drying in liquid $CO_2$.

Figure 8:
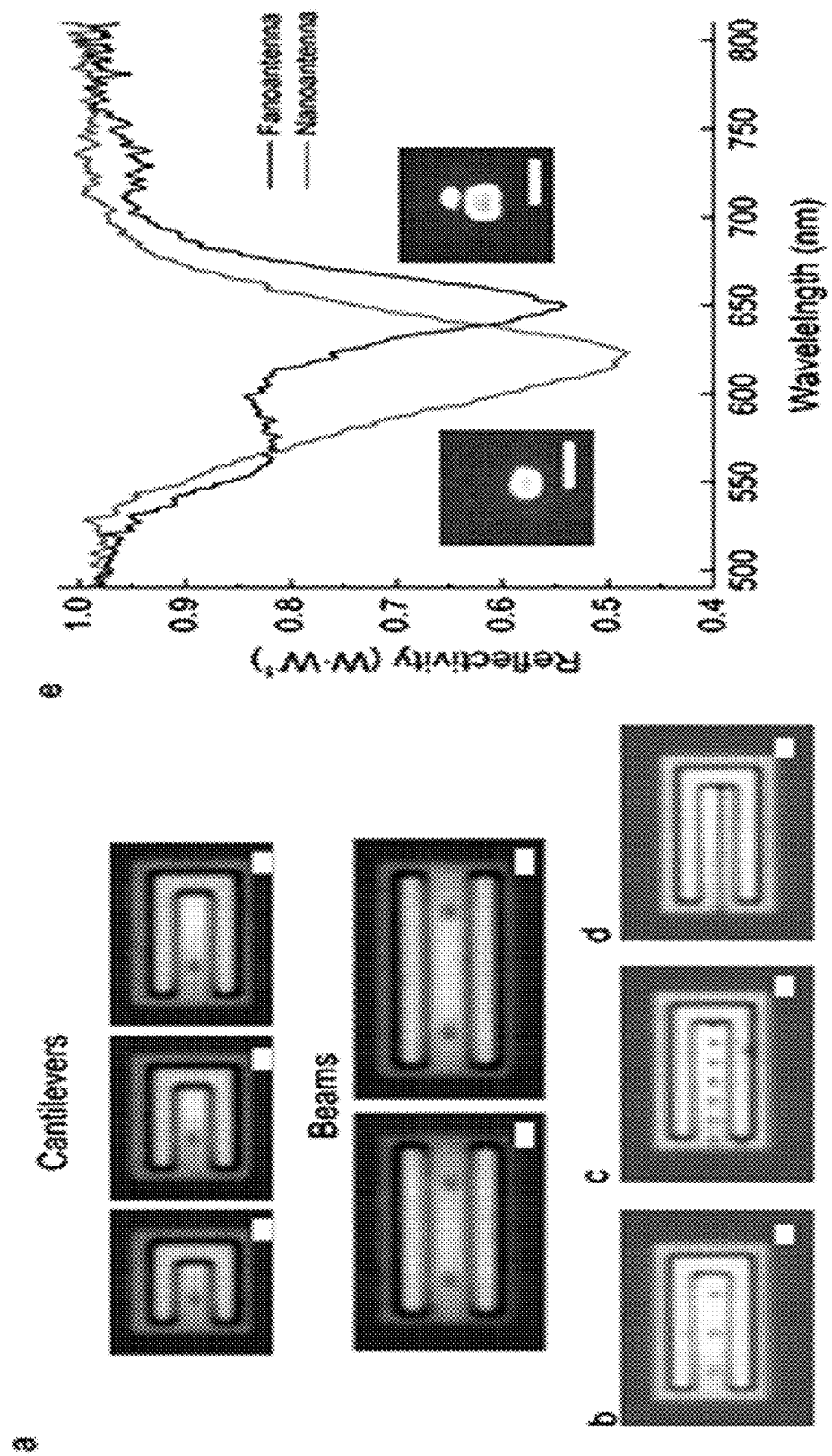
FIG. 8 shows a plurality of localized gap plasmon resonators in panels A that include a cantilever or beam; panel B shows a localized gap plasmon resonator that includes three plasmonic nanoprisms that are separated by 2 µm; panel C shows a localized gap plasmon resonator that includes a plurality of plasmonic nanoprisms that are separated by 1 µm; panel D shows a localized gap plasmon resonator that includes a plurality of plasmonic nanoprisms that are separated by 0.5 µm, wherein scale bars in panels A, B, C, and D are 1 µm; and panel E shows a graph of reflectivity versus wavelength in which the reflectivity is measured for different plasmonic resonators, wherein a nanoantenna (left inset) has dimension 70×50 nm², and a fanoantenna included two nanorods (85×50 nm² and 45×25 nm²) separated by a gap of approximately 10 nm with scale bars are 100 nm.

In some embodiments, the LGP resonators are made with three sequential steps of aligned electron beam lithography (EBL). Gold pads and gold plasmonic nanoprisms are shaped by metal evaporation and liftoff, while dry etching is used for the $SiN_x$ mechanical components such as the NEM member. The plasmon gap between the pad and the plasmonic nanoprism is provided by removal of the uniform Cr sacrificial layer. Cr is selectively removed with a wet-chemical etch to release the $SiN_x$ NEM member, freeing the NEM member to move with respect to the pad. As a result, narrow and very large aspect ratio plasmon gaps are provided. Low-temperature (e.g., 180° C.) plasma-enhanced chemical vapor deposition (PECVD) provides deposition of a conformal $SiN_x$ structural NEMS member layer directly on top of the plasmonic elements (e.g., plasmonic nanoprism, plasmon gap (to be formed by removal of Cr sacrificial layer), and the pad). This deposition disposed the plasmonic nanoprism on the $SiN_x$ NEM member opposing the first plasmon surface of the pad while avoiding morphological changes that can result from surface melting below the bulk melting point of gold. As shown in panels D, E, and F of FIG. 6, a plurality of LGP resonators can be formed in an array format with a different designs and fabricated simultaneously on a same substrate (e.g., a chip) as shown in FIG. 8.

An advantage of the structural arrangement components of the LGP resonator is the ability to tune the mechanical and plasmonic designs of such LGP resonators. Examples of mechanical design variation are shown in panel A of FIG. 8, wherein NEM members include cantilevers and beams with varying lengths. As shown in panels B, C, and D of FIG. 8, plasmonic nanoprisms can be disposed at an arbitrary distance on NEM members, e.g., separations from 2 μm (see, e.g., panel B of FIG. 8) to 500 nm (see, e.g., panel D of FIG. 8). Variations in the design of LGP resonators can be made. Panel E of FIG. 8 shows reflectivity measurements of released NEM members that include a plurality of different nanoantenna designs such as 70×50 $nm^2$ nanorods and fanoantennas including two nanorods measuring 85×50 $nm^2$ and 45×25 $nm^2$ separated by a 10 nm spacing. These data show that an operating spectral range of the NEM member of the LGP resonator can be tuned with the size of the LGP resonator and that initially designed shape of LGP resonators are retained within the released NEM member with high fidelity. The latter point is evidenced by the shoulder in the reflectivity for the fanoantenna at about 575 nm, which resulted from hybridization of the LGP modes between the nanorods. Further, most of the LGP total energy is located within the plasmon gap, which provided both strong coupling between LGP modes and mechanical modes as well as large plasmonic quality factors due to low radiative loss.

Characterizing LGP Modes.

Figure 9:
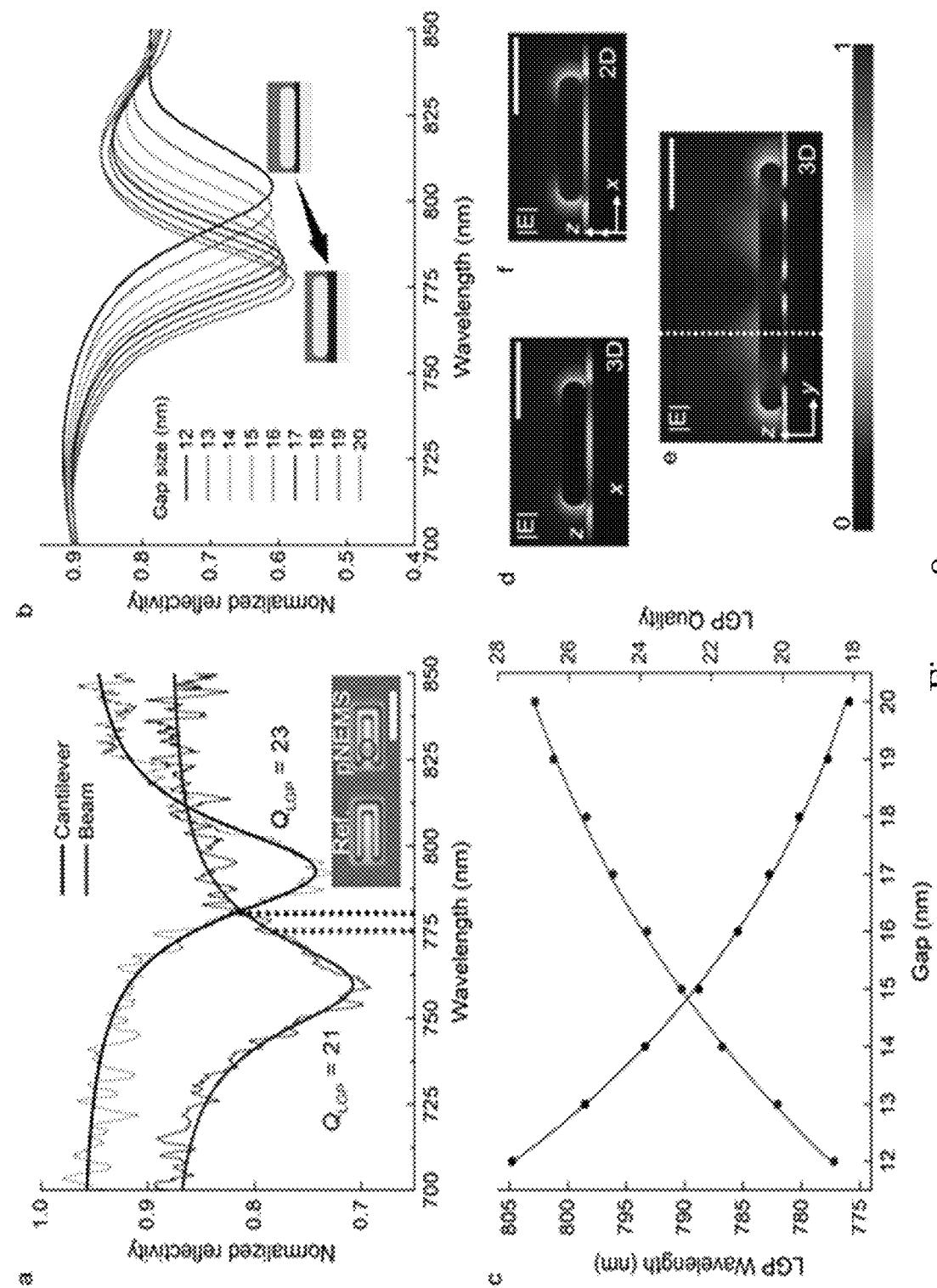
FIG. 9 shows a graph of normalized reflectivity versus wavelength in panel A and panel B; panel C shows a graph of localized gap plasmon (LGP) wavelength and LGP quality versus gap size; panel D shows a map of a normalized value of the LGP total electric field on a plane through a width of a plasmonic nanoprism calculated using a three-dimensional (3D) full field finite element method; panel F shows a map of a normalized value of the LGP total electric field on a plane through a width of a plasmonic nanoprism calculated using a two-dimensional (2D) eigenmode method; panel E shows a normalized electric field calculated by the 3D method and displayed on a plane through a length of a plasmonic nanoprism with dotted-white lines indicating a plane used for 2D calculations, wherein for panels D, E, and F scale bars are 100 nm, and the legend bar represents a magnitude of normalized electric field strength.
Figure 12:
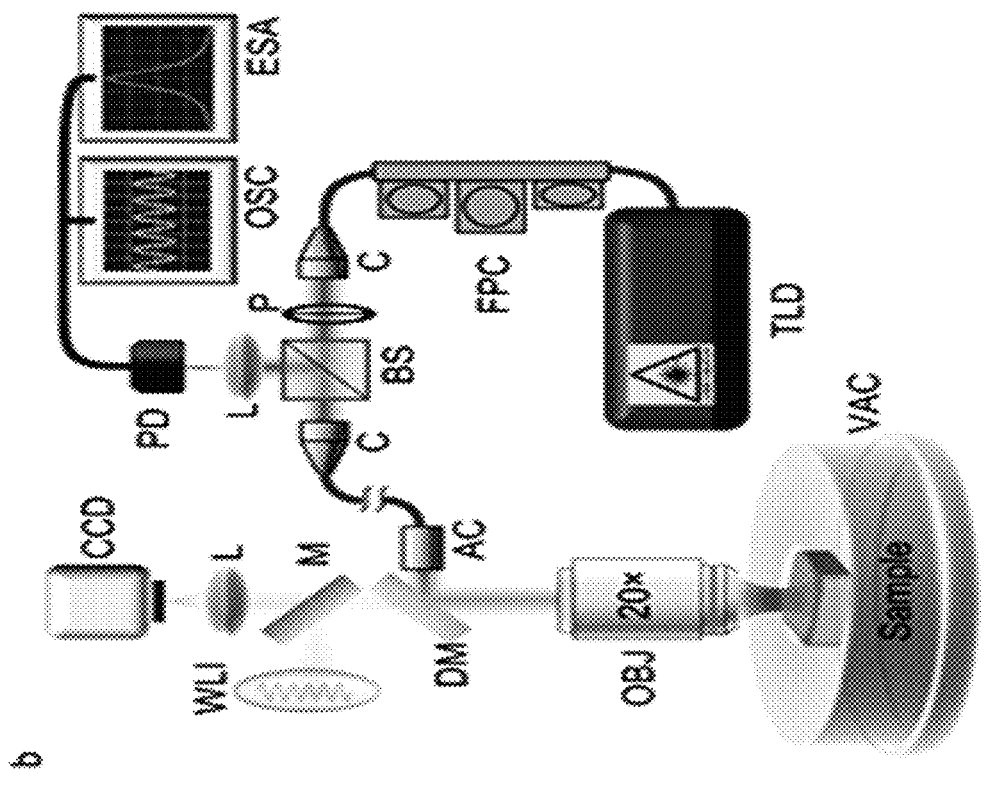
FIG. 12 shows an experimental set up for determining LGP modes of a localized gap plasmon resonator in panel A according to Example 1, and panel B shows an experimental set up for determining mechanical responses of a localized gap plasmon resonator according to Example 1.
Figure 12:
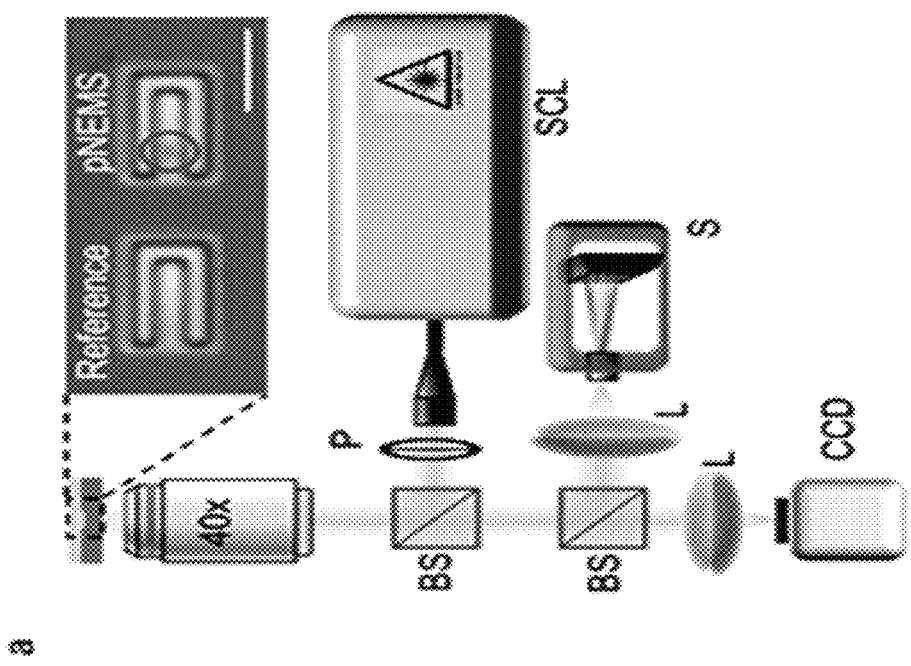
Figure 13:
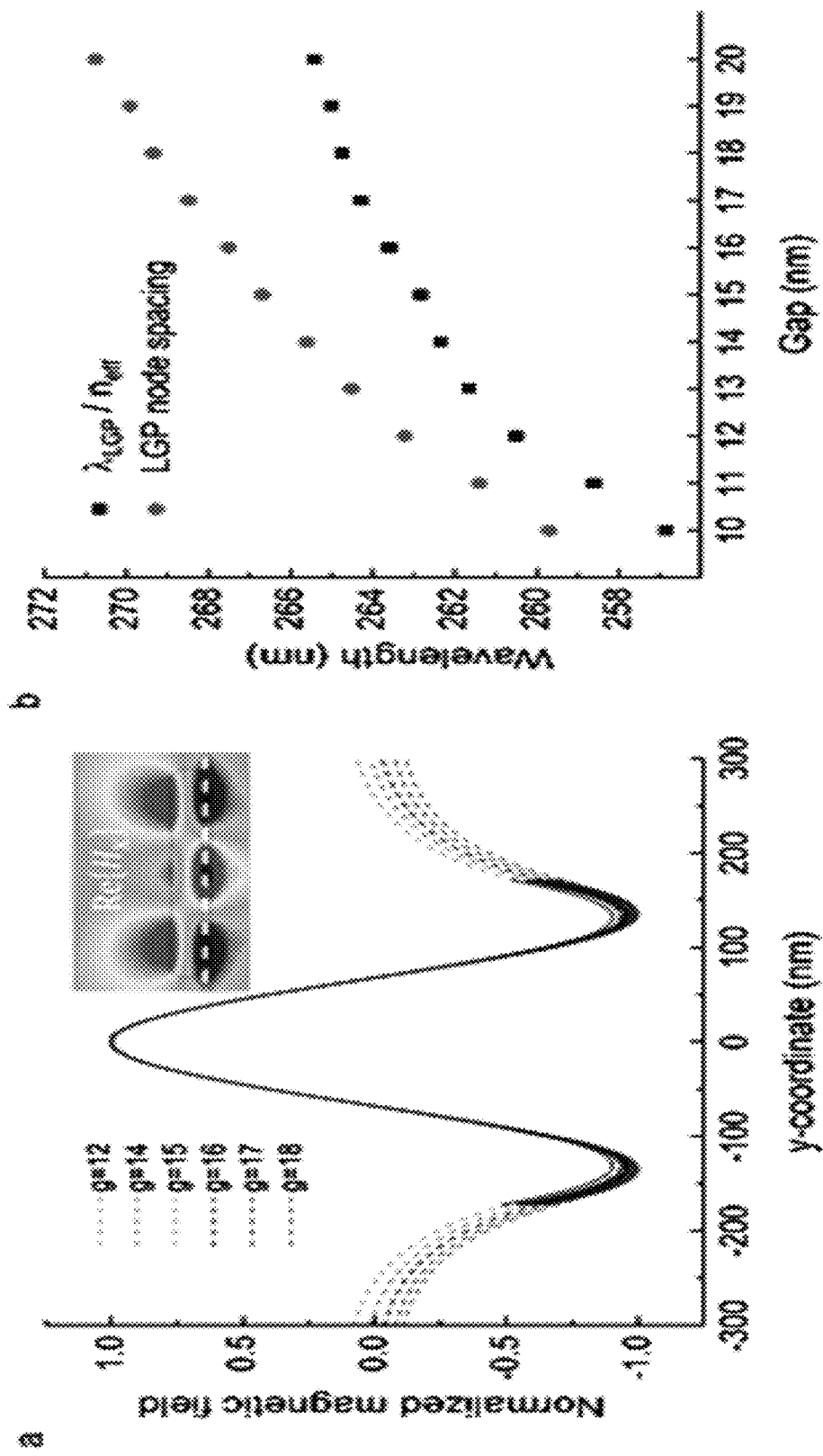
FIG. 13 shows a graph of normalized magnetic field versus y-coordinate in panel A, and a graph of wavelength versus gap size in panel B.

The plasmonic response of the localized gap plasmon resonators discussed above were characterized by confocal spectroscopy on individual LGP resonators (see, e.g., Example 1 and FIG. 12). Panel A of FIG. 9 shows that LGP modes included pronounced dips in reflectivity spectra. Fitting these data to Lorentzian curves, resonant wavelengths ($\lambda_{LGP}$) were 790 nm and 760 nm with quality factors ($Q_{LGP}$) of 23±0.6 and 21.6±1.7 for the cantilever and beam, respectively, wherein uncertainties referred to standard error (s.e.) from the fitting procedure. The measured spectra were consistent with the reflectivity calculated using a three-dimensional (3D), full-vector finite-element frequency-domain computation shown in panel B of FIG. 9. Here, $\lambda_{LGP}$ refers to the free-space probe wavelength at which the LGP mode appears in the measured and calculated reflectivity curves in FIG. 9. However, the physical size of the LGP mode is reduced to $\lambda_{LGP}/n_{eff}$, where $n_{eff}$ is the effective refractive index of the LGP mode (see FIG. 13). For each size (z) of the plasmon gap, $Q_{LGP}$ was determined, and the LGP resonance frequency was $\omega_{LGP}=2\pi c/\lambda_{LGP}$, wherein c is the speed of light (see panel C of FIG. 9), and the corresponding 3D fields (see panels D and E of FIG. 9). The computation reproduces experimentally observed $Q_{LGP}$ greater than 20. Additionally, 2D eigenmode numerical analysis confirmed that the LGP modes are standing-wave LGP resonances formed by two counter-propagating fundamental gap plasmons (see panel F of FIG. 9). The LGP resonance condition is provided by formula 1.

$$\frac{2\pi}{\lambda_{LGP}(z)} n_{eff}(z) L_p + \varphi(z) = m\pi \quad (1)$$

and included a round-trip phase accumulation of 2π·m along the length of the plasmonic nanoprism $L_p$, with a reflection phase φ and mode order m=3 for the particular LGP resonators studied here. The effective index for each z was calculated with input eigenfrequency of $\omega_{LGP}(z)$ determined at the same gap size from the 3D calculations. The LGP resonators were designed to operate in the spectral region near 780 nm using this higher order mode, which reduced coupling to radiation compared to the fundamental and that produced large quality factors. Given numerically calculated values for $n_{eff}(z)$ and $\lambda_{LGP}(z)$, the gap dependent reflection phase φ(z) was calculated using formula (1). The LGP resonator can support hybrid dielectric-loaded surface plasmon traveling modes propagating parallel to the pad surface and through the effective waveguide formed by the $SiN_x$ NEM member beams. While small coupling to these modes can contribute to overall radiation loss in LGP resonators, such modes may not form standing wave resonances strong enough to hybridize with the LGP to alter spectral behavior.

A semi-analytical formula for the optomechanical coupling strength $g_{OM}$ was obtained from the dependence of the plasmon on $\lambda_{LGP}$, $n_{eff}$, and φ, wherein $g_{OM}=\partial\omega_{LGP}/\partial z \propto \delta\lambda_{LGP}/\partial z$ for the LGP resonator. Optomechanical coupling strength $g_{OM}$ provides a strength of the interaction between the plasmonic and mechanical resonances in the LGP resonator and determines the ultimate transduction gain when using the LGP resonator is used as a motion sensor. Moreover, optomechanical coupling strength $g_{OM}$ is provided as formula 2.

$$g_{OM} = -\frac{c}{L_p n_{eff}} \left( \frac{m\pi - \varphi}{n_{eff}} \frac{\partial n_{eff}}{\partial z} + \frac{\partial \varphi}{\partial z} \right), \quad (2)$$

Figure 10:
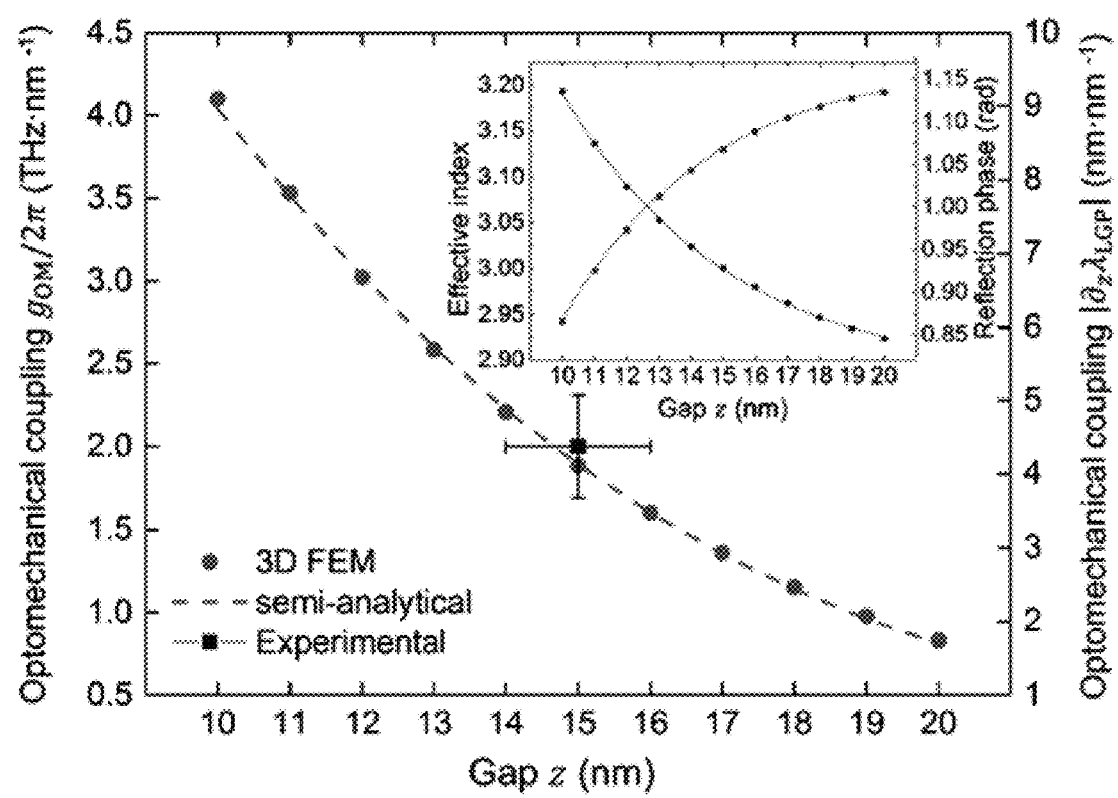
FIG. 10 shows a graph of optomechanical coupling versus gap size, and (inset) a graph of the effective index and reflected phase versus gap size.

The optomechanical coupling arises from the plasmon gap-dependent effective index and reflection phase. FIG. 10 shows calculated $g_{OM}/2\pi$ as a function of plasmon gap size. The 3D values of $g_{OM}$ are extracted directly from the spectral shift in reflectivity with changing gap, whereas the semi-analytical curve is calculated using formula (2) and the values for $n_{eff}$ and $\varphi$ (see the inset shown in FIG. 10). The semi-analytical result provides separation of the two contributions such that the rapid increase in $g_{OM}$ results from the increase in $n_{eff}$ with decreasing gap, being partially offset by the phase term (see, e.g., FIG. 14). The reduced reflection phase with smaller gaps can be interpreted as the decrease in the effective LGP resonator length due to the tighter longitudinal confinement of the LGP mode.

Subdiffraction Optical Motion Transduction.

Figure 15:
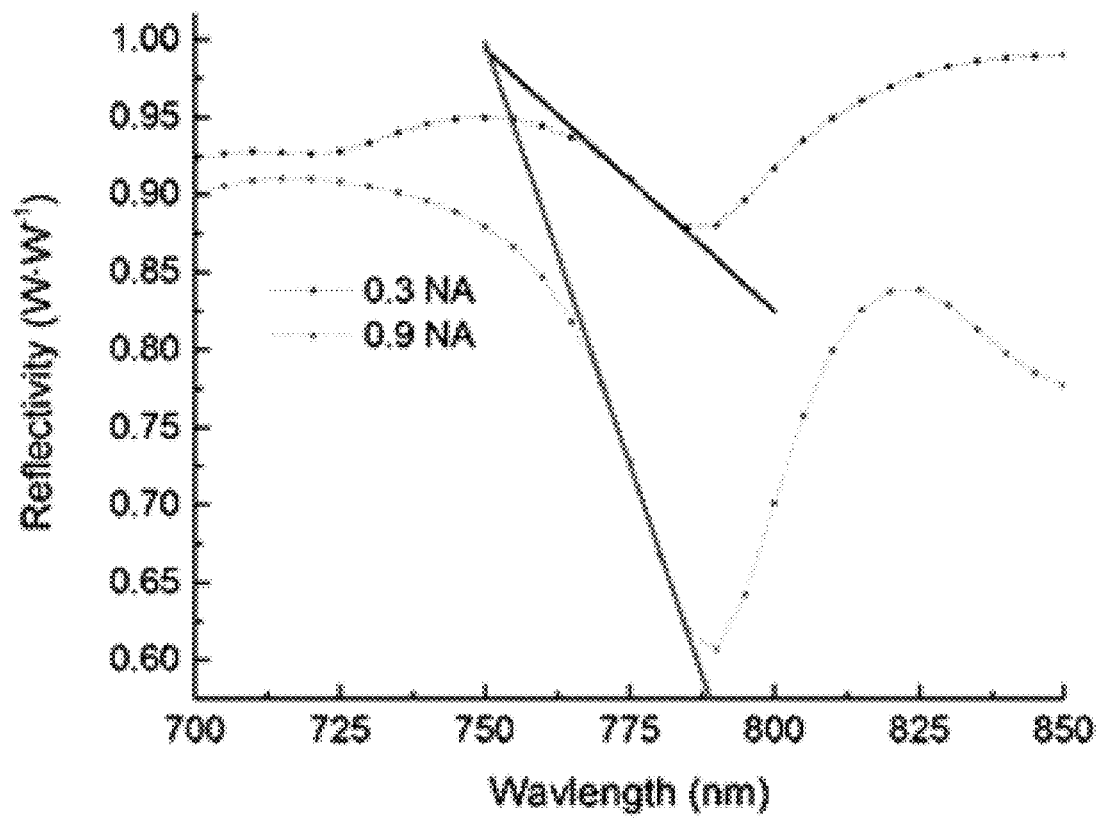
FIG. 15 shows a graph of reflectivity versus wavelength.

Strong confinement and optomechanical coupling of LGP by the LGP resonator provides a highly sensitive motion determination of very small mass NEM members, e.g., the 600 femtogram (fg) cantilever shown in panel F of FIG. 6. The LGP resonator resonantly enhances the phase and amplitude change of the far-field optical response while probing the motion from a nanoscale area, not limited by diffraction. A phase-sensitive measurement can be used for detection of motion of NEM member 6. Additionally, motion-induced LGP resonance shift can be detected via an amplitude-modulated reflectivity signal. Near-room-temperature thermally induced motion of the NEM member of the LGP resonator, which was placed in a vacuum chamber to mitigate mechanical damping, was determined using a confocal system. Here, a tunable laser is focused onto the sample through an optical window with a low-numerical aperture (NA=0.3) objective (see, e.g., FIG. 15). The probe wavelength ($\lambda_p$) is detuned from $\lambda_{LGP}$ to a fixed position near the maximum slope in the spectral reflectivity (R) to maximize the reflection amplitude modulation signal $\partial R/\partial z \propto Q_{LGP} g_{OM}$ in accord with details provided in Example 3.

Figure 11:
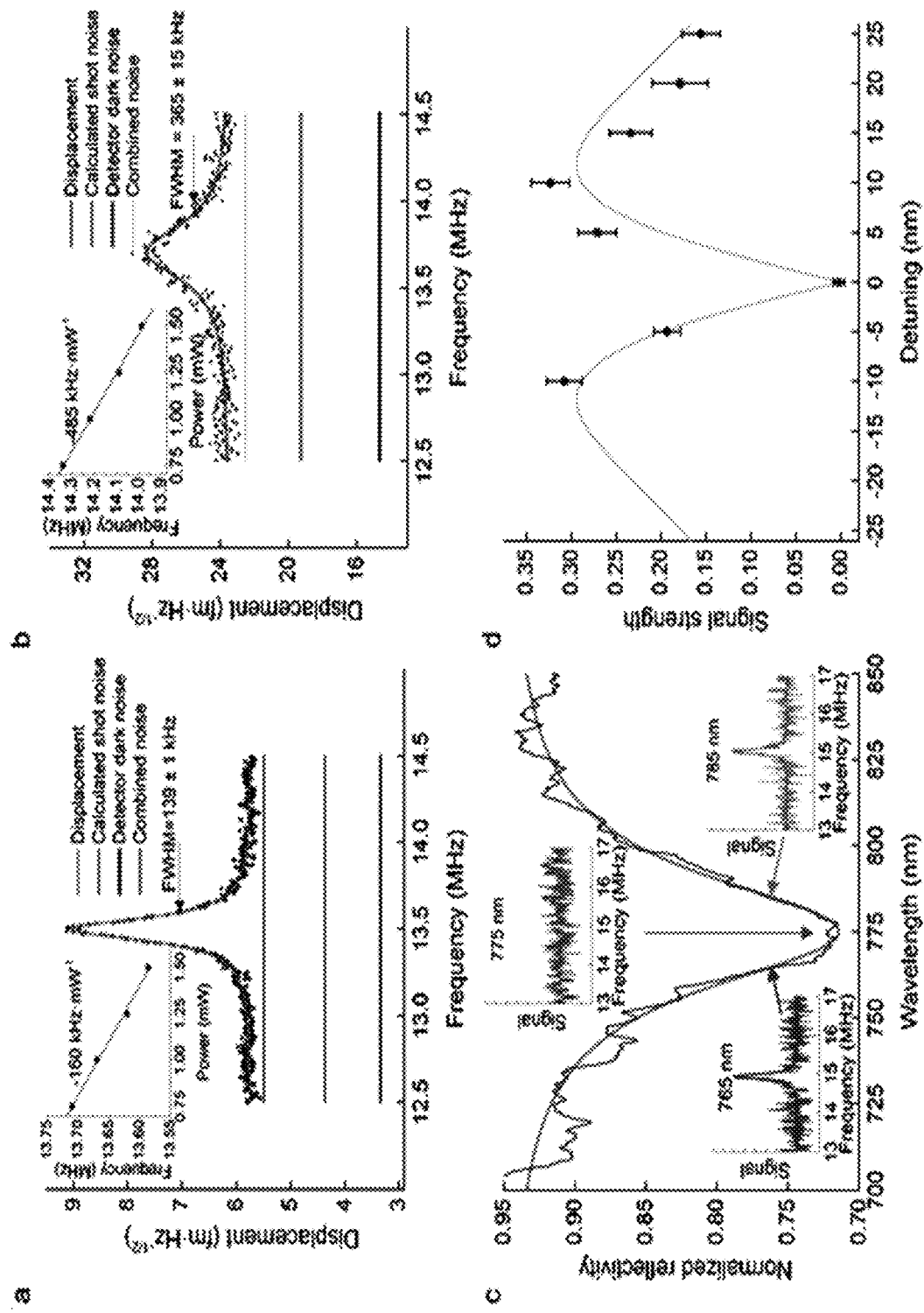
FIG. 11 shows graphs of displacement versus frequency in panel A and panel B, a graph of normalized reflectivity versus wavelength in panel C, and a graph of signal strength versus detuning in panel D.

Panel A and panel B of FIG. 11 show the thermal motion peaks in the spectra, which were well above the measurement background for both LGP resonators. Raw voltage signals, which were proportional to the vertical displacement of the plasmonic nanoprism, were calibrated by fitting the measured voltage power spectral density to a Lorentzian $S_{zz}(\omega)$ with an area given by the equipartition theorem (see, e.g., Example 4 and FIG. 16). From these results, transduction gains were obtained as $\alpha$=15.1 mV·nm$^{-1}$1.9 mV·nm$^{-1}$ and 3.5 mV·nm$^{-1}$±0.5 mV·nm$^{-1}$ and measurement noise floors $S_{zz,0}^{1/2}$=5.8 fm·Hz$^{-1/2}$±0.7 fm·Hz$^{-1/2}$ and 23 fm·Hz$^{-1/2}$±2.5 fm·Hz$^{-1/2}$ for the cantilever and beam, respectively, of the LGP resonators. For both LGP resonators, the same detector dark voltage noise corresponds to different values of the input-referred mechanical displacement noise shown in panels A and B of FIG. 11. The different transduction gains determined for each LGP resonator produced these differing values. The cantilever measurement noise floor was four times better than theoretically achievable using Doppler vibrometry on a large perfect reflector, shot noise limited at the same detected optical power ($P_0$=45 µW). However, the LGP resonator has the advantage that the high-precision motion transduction occurs from an area (the LGP mode footprint) 150 times smaller than the diffraction-limited, 3.2 µm diameter focal spot used to probe the system.

The LGP motion transduction mechanism is verified using probe-wavelength-dependent measurements of motion on a third LGP resonator that included an 8 µm beam as the NEM member with LGP spectral reflectivity centered at 775 nm (see panel C of FIG. 11). Over the wavelength detuning range ($\lambda_p - \lambda_{LGP}$), the strength of the signal, given by the dimensionless quantity $S_{zz}(\Omega_m)/S_{zz,0}$-1, closely follows the $|\partial R/\partial \lambda|$ shape predicted from a Lorentzian fit to the LGP resonance of this LGP resonator (see panel D of FIG. 11). The motion signal disappears when focusing the probe laser along the cantilever away from the plasmonic nanoprism (see Example 5).

The LGP resonator has large optomechanical coupling of LGP modes, which are provided from transduction gain $\alpha$ via formula 3.

$$g_{OM} = \frac{c}{\lambda_p^2} \eta \left| \frac{1}{R_0} \frac{\partial R}{\partial \lambda} \right|^{-1} \frac{\alpha}{P_0 G_{DC}}, \quad (3)$$

wherein $G_{DC}$=25 mV·µW$^{-1}$ is the measured photodiode gain; $|\partial R/\partial \lambda|$ is the reflectivity slope evaluated at $\lambda_p$ from the spectral measurement shown in panel A of FIG. 9, and $R_0$ is the off-resonance reflectivity. The factor $\eta \approx 3.3$ accounts for a reduced $|\partial R/\partial \lambda|$ due to the lower NA in the motion measurement system compared to the spectroscopic measurements (see, e.g., FIG. 15). Using formula (3), the optomechanical coupling constants were $g_{OM}/2\pi$=2.0 THz·nm$^{-1}$±0.3 THz·nm$^{-1}$ for the cantilever and 0.6 THz·nm$^{-1}$±0.1 THz·nm$^{-1}$ for the beam.

FIG. 11 shows that varying the input power of the measurement laser causes a linear reduction in the mechanical frequency for both LGP resonators (see insets of panel A and panel B of FIG. 11). Similarly, a change in the mechanical frequency of the third beam LGP resonator as a function of detuning occurred as shown in the inset of panel C of FIG. 11.

In an embodiment, the LGP resonator can include tailored thermal bimorph or electrostatic actuation that can be formed by patterning during fabrication of the LGP resonator, e.g., prior to release of the NEM member. Accordingly, such an LGP resonator provides LGP resonator tunability by electrical detection as well as optical detection.

The articles and processes herein are illustrated further by the following Examples, which are non-limiting.

EXAMPLES

Example 1. Determination of LGP Modes and Mechanical Response of LGP Resonator

A setup to probe LGP modes includes a broadband supercontinuum (SC) laser spanning a wavelength range of 500 nm to 2000 nm coupled into an inverted microscope with a 40×, 0.9 NA objective lens is shown in panel A of FIG. 12. The SC laser is passed through an IR spectral filter to remove wavelengths greater than 850 nm, a neutral density filter to control intensity, a broadband polarizer to establish TM excitation of the sample, and a beam-expansion telescope to produce a 10 mm beam diameter that overfills the objective back aperture. Reflected light from the sample is imaged simultaneously onto a CCD for visual inspection and a fiber-coupled spectrometer for spectral analysis. In all cases, reported spectra are taken with 50 ms integration time and represent the average of 20 individual spectra. A reference spectrum (Ref) is first taken from a reference device without plasmonic structures by focusing the SC at 1.5 µm (2.0 µm) from the cantilever (beam) base. A closed-loop stage with positioning precision of less than 100 nm is used to move the LGP resonator under test into the laser spot and a sample spectrum is taken (S). The LGP spectrum is then calculated by (S−D)/(Ref−D), wherein D is the detector dark spectrum collected with the laser off. For each plasmonic nanoprism measured, a new reference spectrum is collected to account for possible spectral drift in the SC source.

A second setup shown in panel B of FIG. 12 and was used to measure mechanical responses. Here, a microscope assembly was optically coupled to a vacuum chamber using a 20×, 0.3 NA glass-corrected, long-working distance objective. Laser light from a fiber-coupled diode laser is collimated to free space, passed through a beamsplitter, and then coupled into a polarization-maintaining, single-mode fiber. Light is delivered to the objective through an achromatic collimator, which produces a 7.5 mm output beam, and a dichroic mirror exhibiting 96% reflection over a 765 nm to 800 nm wavelength band. Optical power delivered to the sample (e.g., the NEM member of the LGP resonator), measured using a photodetector inserted after the objective and before the vacuum chamber window, is set by a fiber-coupled polarization controller followed by a free-space polarizer. Reflected laser light is passed back through the same optical train and imaged on to 125 MHz bandwidth photodetector connected to an oscilloscope for measuring direct current (DC) voltage. A fast-Fourier transform spectrum analyzer operating a 10 kHz resolution bandwidth is used to monitor the frequency domain signal. Reported spectra are the average of 500 individual scans taken over a 0.02 s window per scan. Measurements are performed with vacuum chamber pressure less than 0.1 Pa ($10^{-3}$ Torr) to minimize frictional damping on the devices.

Example 2. Electromagnetic Calculations of LGP Modes

For 3D electromagnetic calculations, a total-field formulation is used, in which a Gaussian beam ($E_b$) focused to a waist 1.22λ/NA with NA=0.9 is introduced into the system at the boundary. The domain comprises a Si substrate, 45 nm Au pad, 350×165×35 $nm^3$ plasmonic nanoprism, and a 175 nm thick, 1.25 µm wide $SiN_x$ NEM member suspended above the Au pad by a variable plasmon gap. The $SiN_x$ NEM member has a refractive index of 1.98 as determined from ellipsometry measurements of the deposited films. The Si has a refractive index of 3.7. The reflectivity is calculated as $|S_{11,samp}|^2$ where $S_{11,samp} = \iint(E_t - E_b) \cdot E_b dA \cdot (\iint E_b \cdot E_b dA)^{-1}$ where integration is performed over the incident port area; $E_t = E_b + E_s$ with scattered field $E_s$. Here, the plasmonic far-field response of the LGP resonator is provided by $|S_{11,samp}|^2/|S_{11,ref}|^2$, where $S_{11,ref}$ is calculated without the plasmonic nanoprism.

The 2D eigenmode calculations are performed as function of plasmon gap size on a plane representing the center cross section of the 3D model, with the plane normal aligned with the long-axis of the plasmonic nanoprism. Eigenmode frequencies corresponding to the $\lambda_{LGP}(z)$ values from the 3D model are used to determine the effective index and LGP wavevector of a fundamental gap plasmon mode travelling under a 165 nm wide slab of infinite extent along the length-axis of the plasmonic nanoprism. We also extract amplitude-normalized electric and magnetic field distributions for comparison with the 3D calculations. The field distributions of the 2D gap plasmon match the 3D distributions nearly identically as shown in panels D, E, and F of FIG. 9. Furthermore, the 3D fields show distinct intensity extrema in the gap, whose period closely matches $\lambda_{LGP}/n_{eff}$, where $n_{eff}$ is the plasmon gap effective index determined from the wavevector of the 2D eigenmode. This correspondence is verified by fitting the real component of the x-polarized magnetic field (perpendicular to the prism long-axis) taken from a line in the middle of the plasmon gap (see inset of panel A shown in FIG. 13) of the 3D numerical simulation to a sinusoidal function for the various gap sizes considered. The results of these fits are given in panel A of FIG. 13, which shows a close correspondence of fits to the numerical data. The period of these sinusoidal fits determine the standing-wave LGP wavelength resonance of the LGP mode. Comparing the period with the physical wavelength of the LGP mode inside the plasmon gap, derived from the 2D eigenvalue numerical calculation $\lambda_{LGP}/n_{eff}$, the two values agree to within 2% for the parameter range investigated here (see panel B of FIG. 13). These data show that the modes supported by the LGP resonator are standing wave plasmon gap plasmons.

Figure 14:
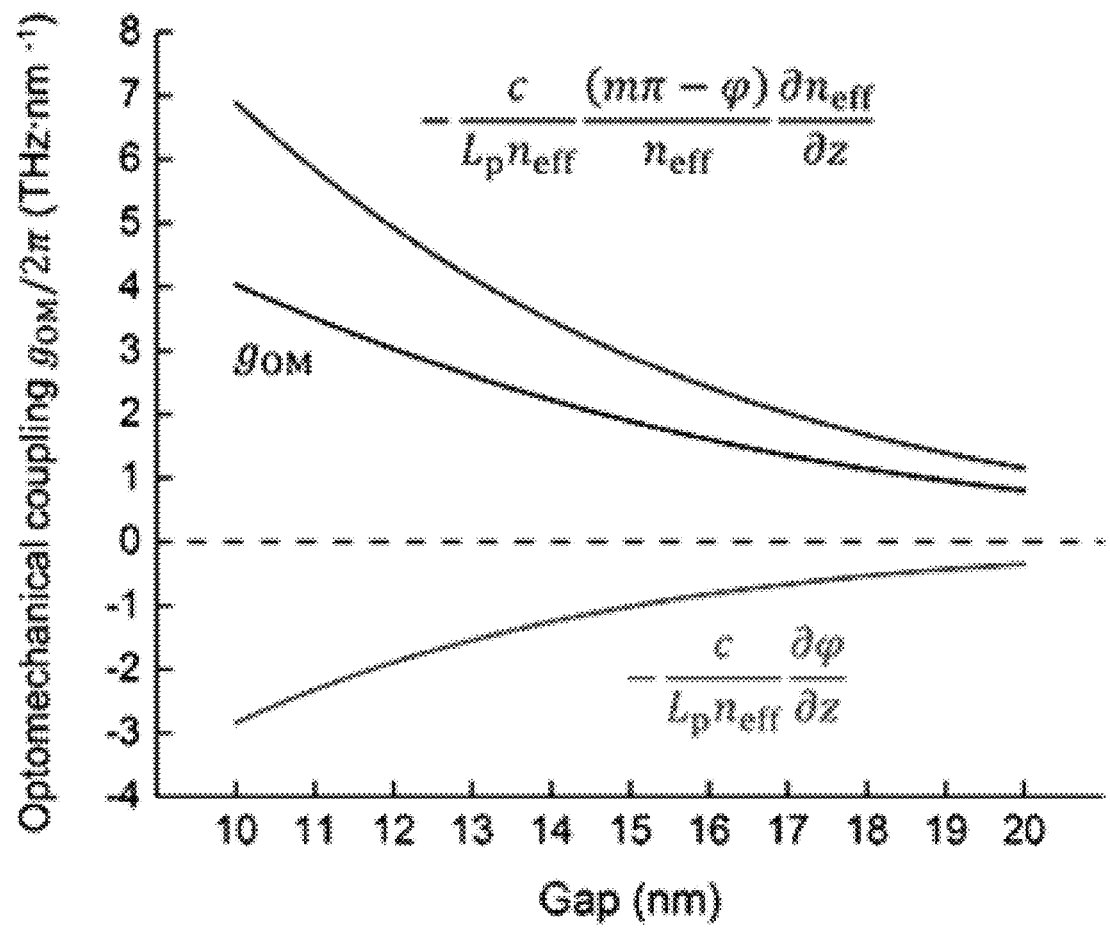
FIG. 14 shows a graph of optomechanical coupling versus gap size.

The change in $\lambda_{LGP}$ with increasing gap size is related to the optomechanical coupling constant via provided in formula 4.

$$g_{OM} = \frac{\partial \omega_{LGP}}{\partial z} = \frac{2\pi c}{\lambda_{LGP}^2} \frac{\partial \lambda_{LGP}}{\partial z}, \quad (4)$$

wherein c is the speed of light, and $\omega_{LGP}$ is the angular frequency of the LGP mode. We therefore use the wavelength dependence $\partial \lambda_{LGP}/\partial Z$ to characterize the optomechanical coupling strength of the LGP resonator. The semi-analytical expression for the optomechanical coupling constant, given in formula (2), which combines the results of all computational data, consists of two terms relating to the change of effective index and reflected phase of the LGPs as the size of the plasmon gap changes. The relative contribution of the effective index and phase derivatives to the optomechanical coupling are shown in FIG. 14. Here, the negative value of $g_{OM}$ indicates the blue shift in wavelength with increasing gap.

Example 3. Motion Transduction in LGP Resonator with Reflectivity Based Measurement The motion transduction signal for an LGP resonator is provided from measurement of intensity of light reflected from the plasmonic nanoprism. The plasmonic response is modeled as a Lorentzian function provided by formula 5

$$R(\lambda) = A_0 \frac{\Delta \lambda^2}{4(\lambda - \lambda_{LGP})^2 + \Delta \lambda^2}, \quad (5)$$

wherein $A_0$ is the amplitude, $\lambda_{LGP}$ is the resonance LGP wavelength of the localized gap plasmon; λ is the free-space wavelength, and the linewidth is given by $\Delta t = \lambda_{LGP}/Q_{LGP}$, with quality factor $Q_{LGP}$. The LGP resonance is probed by measuring the change in reflectivity provide in formula 6.

$$\delta R = \partial R/\partial \lambda \cdot \frac{\partial \lambda_{LPG}}{\partial z} \delta z, \quad (6)$$

The reflectivity signal is provided by formula 7.

$$|\delta R| = \frac{8 A_0 Q_{LGP}^2 \lambda_{LGP}^2 (\lambda - \lambda_{LGP})}{[4 Q_{LGP}^2 (\lambda - \lambda_{LGP})^2 + \lambda_{LGP}^2]^2} \cdot \frac{\partial \lambda_{LGP}}{\partial z} \delta z. \quad (7)$$

The reflectivity signal is a maximum at $\partial^2 R/\partial\lambda^2=0$, which occurs at wavelengths provided by formula 8

$$\lambda_s = \lambda_{LGP}\left(1 \pm \frac{1}{2\sqrt{3}\, Q_{LGP}}\right), \quad (8)$$

on the blue (−) and red (+) side of the resonance. Probing the reflectivity at $\lambda_s$ gives $$\delta R(\lambda_s) = \frac{3\sqrt{3}\, A_0 Q_{LGP}}{4\lambda_{LGP}} \cdot \frac{\partial \lambda_{LGP}}{\partial z} \delta z, \quad (9)$$

such that $$\frac{\delta R}{\delta z}(\lambda_s) \propto Q_{LGP} g_{OM}. \quad (10)$$

The optomechanical coupling constant for the pNEMS is provided in formula 11

$$g_{OM}/2\pi = \frac{1}{2\pi}\frac{\partial \omega_{LGP}}{\partial z} = \frac{c}{\lambda_p^2}\eta\left|\frac{1}{R_0}\frac{\partial R}{\partial\lambda}\right|^{-1}\frac{\alpha}{P_0 G_{DC}}, \quad (11)$$

wherein $\lambda_p$ is the wavelength used to probe the mechanical resonance; $P_0$ is the power measured at the photodetector (e.g., 45 µW); $R_0$ is the reflectivity at $\lambda_p$, and $G_{DC}$ is the photodetector gain measured to be 25 mV·µW$^{-1}$ for one mW of input optical power. In order to account for the changes in slope $\partial R/\partial\lambda$ from use of different measurement setups, we include the factor $\eta \approx 3.3$. This value accounts for the reduction in slope for mechanical measurements, performed with a 0.3 NA objective, compared to spectroscopic measurements performed at 0.9 NA. The numerically determined factor is approximately equal to the ratio of the NA of the two systems, as would be expected in the limit of small optical cross section (see FIG. 15).

Formulas (6-9) analyze the change in optical reflectivity from LGP caused by motion through a change in the LGP frequency. In a different LGP configuration, additional and useful optical motion transduction signals arise from motion-induced changes to the intrinsic optical loss rate and the optical loss rate by radiation. More specifically, for larger LGP gaps of about 30 nm to 50 nm it has been discovered that a change in gap changes the optical loss rate by radiation, which results in a change of the reflectivity. Specifically, a motion changes the depth of the resonance dip in the transmission spectrum, i.e. $A_0$ is a function of z.

Example 4. Mechanical Model and Calibration

Determination of device clamping conditions and stress state.

To determine the mechanical behavior of the LGP resonator, the results of finite-element calculations are combined with mechanical frequency ($\Omega_m=2\pi f_m$) measurements of LGP resonators. The resonant frequency of the LGP resonators is provided by formula 12

$$\Omega_m = \frac{A}{\sqrt{12}}\frac{h}{L^2}\sqrt{\frac{E}{\rho}}, \quad (12)$$

for a nitride beam as the NEM member with length L, a rectangular cross section of thickness h, elastic modulus E, and density ρ. Here, A is a parameter that represents the clamping conditions of the LGP resonator with values of 3.52 and 22.4 for an ideal singly and doubly-clamped beam as the NEM member rigidly attached at their bases, respectively, to a substrate. Using a Doppler vibrometer, $f_m$ for a set of nominally 5 µm, 6 µm, and 7 µm cantilevers was measured by focusing the 633 nm wavelength laser at the free end of the NEM members where thermally excited vibration amplitude is largest.

Figure 16:
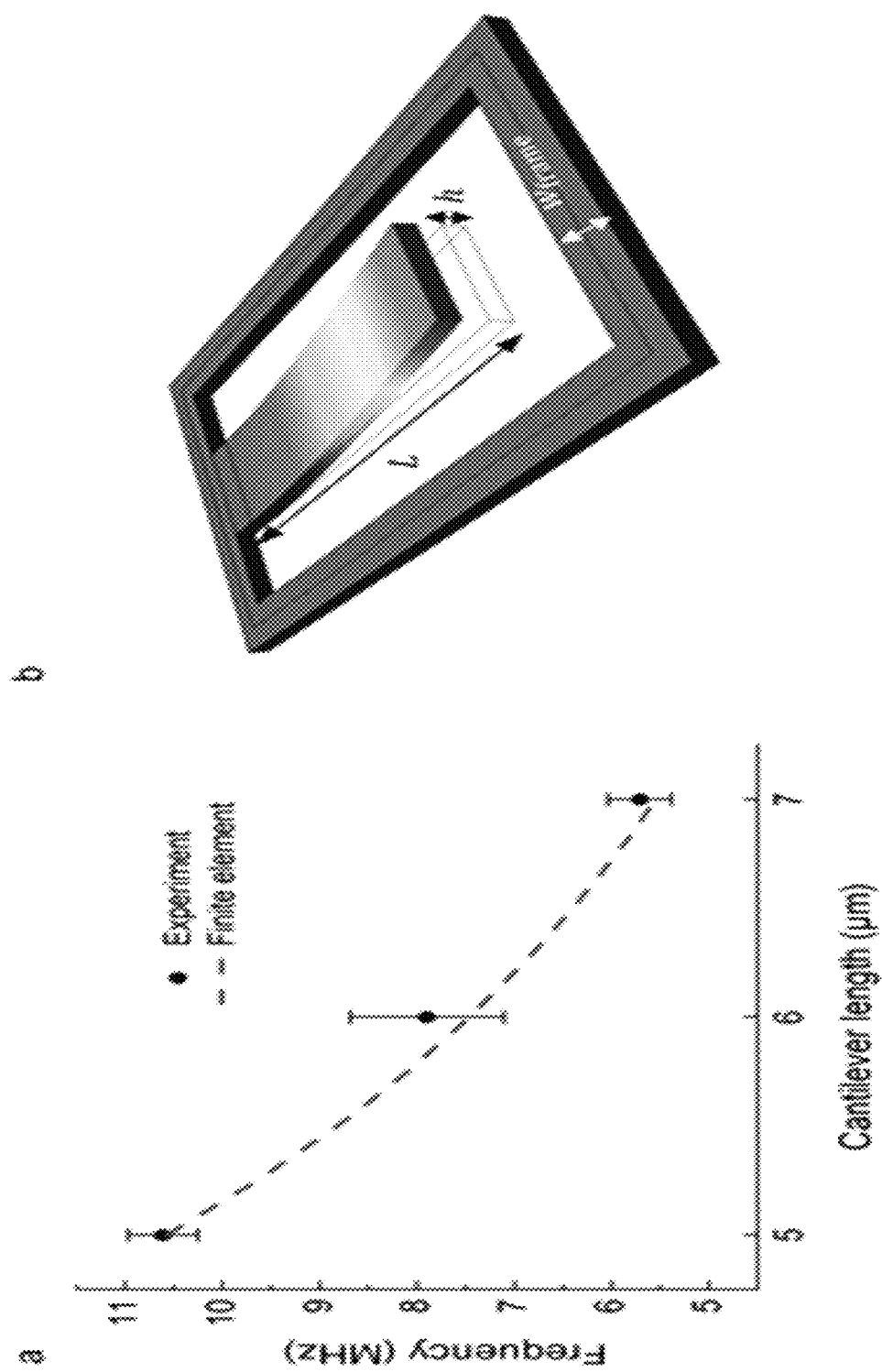
FIG. 16 shows a graph of frequency versus cantilever length in panel A, and a mechanical model of a localized gap plasmon resonator.

Panel A of FIG. 16 shows results of measurements along with the values of $f_m$ predicted from a finite element mechanical model (broken curve). The model is based on the geometry shown in panel B of FIG. 16, wherein the cantilever or beam is attached to a frame with a designed width $w_{frame}$ of 500 nm. To match the finite-element predicted frequencies with experimental values, the material parameters, clamping conditions (equivalently A), and device dimensions must be known. The dimensions are taken from SEM images of the NEM members of the LGP resonators giving thickness of 185 nm and 165 nm for the 5 µm cantilever and 8 µm beam, respectively. For material parameters, we use an elastic modulus of 220 GPa (determined from nanoindentor measurements), a Poisson ratio of 0.2, and a mass density of 2200 kg·m$^{-3}$.

Figure 17:
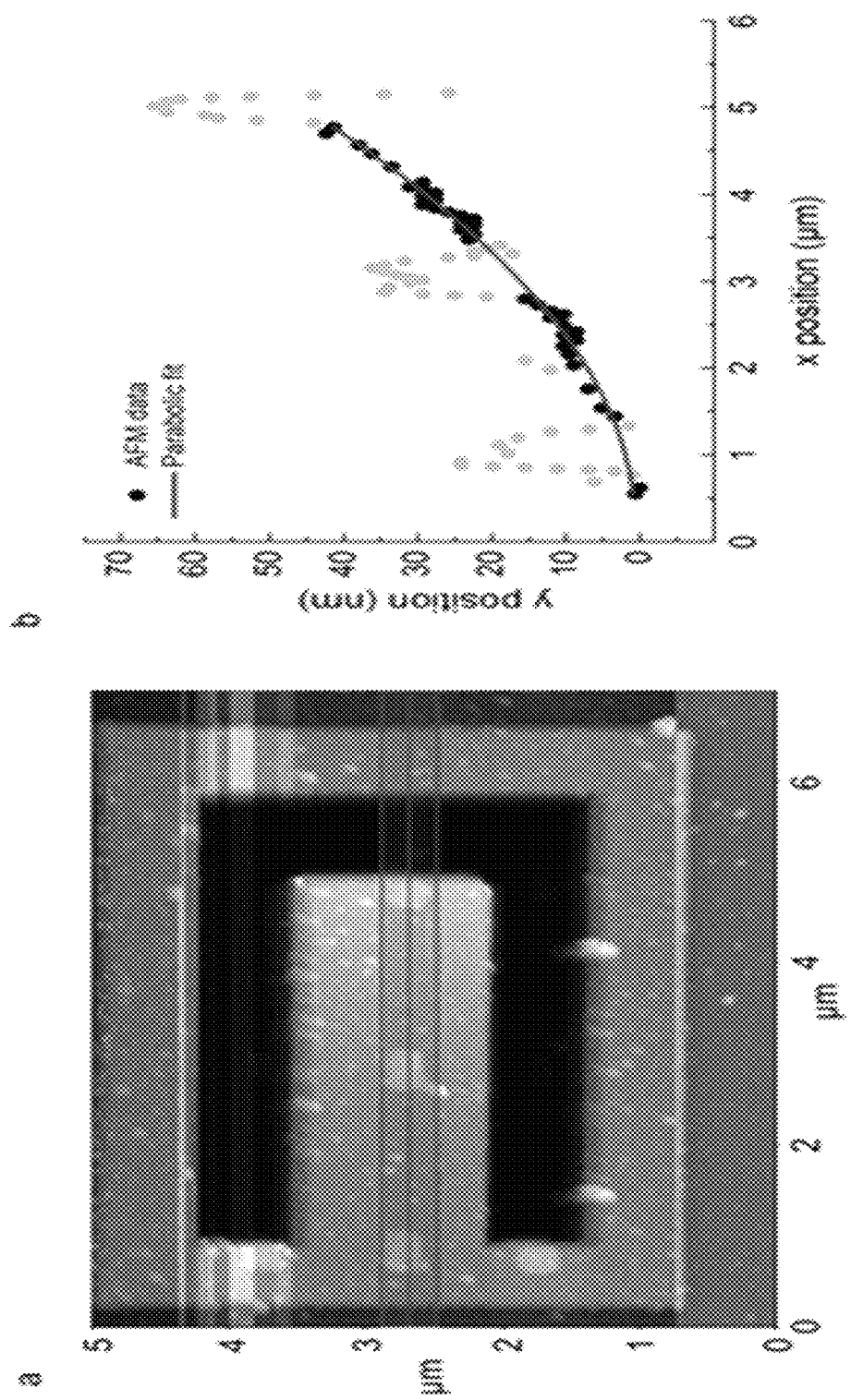
FIG. 17 shows an image of a localized gap plasmon resonator in panel A, and a graph of Y-position versus X-position for the localized gap plasmon resonator shown in panel A.

The LGP resonator with the cantilever NEM member was subjected to imaging with an atomic force microscope (AFM). Fitting the AFM height data to a parabola (see panel B of FIG. 17) gives the curvature of the nitride of the silicon nitride of the NEM member due to the stress gradient. Using this curvature, the experimentally determined maximum deflection value at the tip of a 5 µm cantilever is 60 nm. From these data, the maximum gap size for an LGP resonator 1.5 µm from the base, including the sum of 12 nm sacrificial layer and stress-induced deflection, is 16 nm. Similarly, for the 8 µm beam, a predicted beam deflection away from the substrate of 15 nm at the beam center, resulting in a net 21 nm gap at the prism location. A ±1 nm error bar in the gap size determined from this method corresponds to the s.e. of the parabolic fit.

Calculation of Modal Mass, Modal Displacement, and Effective Stiffness.

Figure 18:
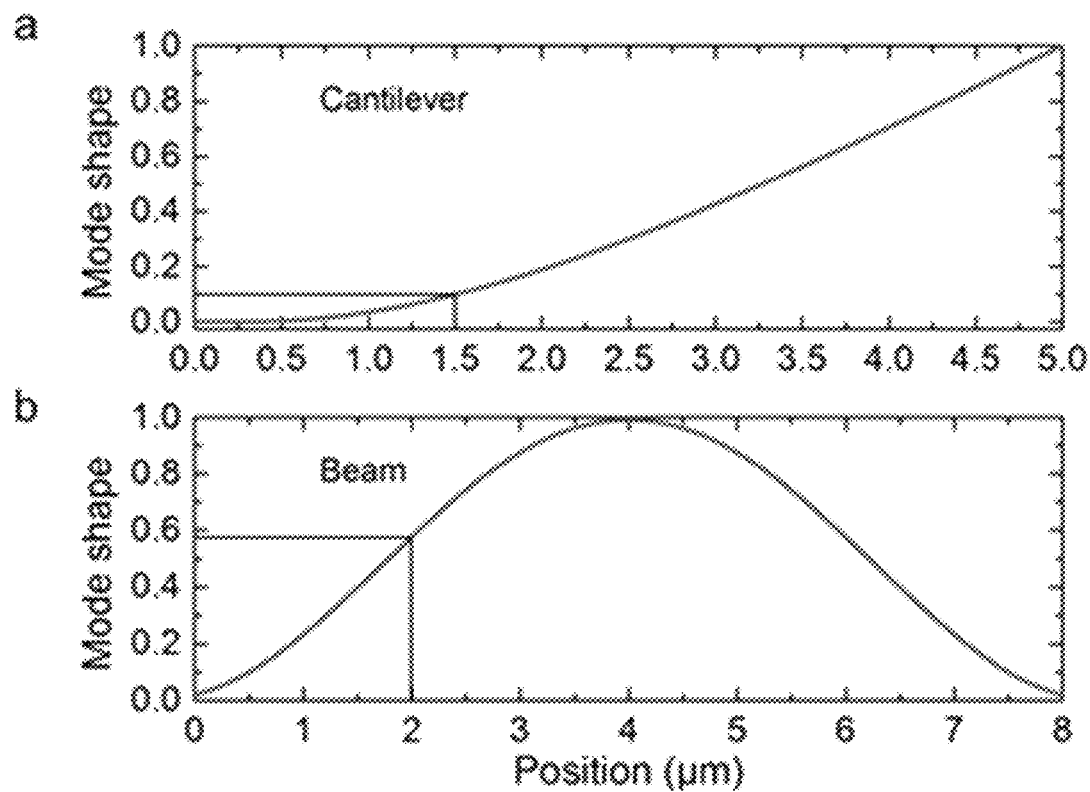
FIG. 18 shows graphs of mode shape versus position.

Using the finite element model above, we determine the modal mass by extracting the normalized mode shape Φ for the fundamental mode of the LGP resonator, which gives $m_{eff,q}=\int \rho |\Phi|^2 dV/q^2$ where q a generalized coordinate for the displacement of the plasmonic nanoprism. Maximum modal displacement ($c_i$) values determine the effective stiffness of the mechanical modes of the LGP resonator via $\kappa_{eff}=m_{eff}\Omega_m^2 \cdot c_i^{-2}$ and are extracted from the mode shapes as shown in FIG. 18.

Plasmonic Heating Effects.

Figure 19:
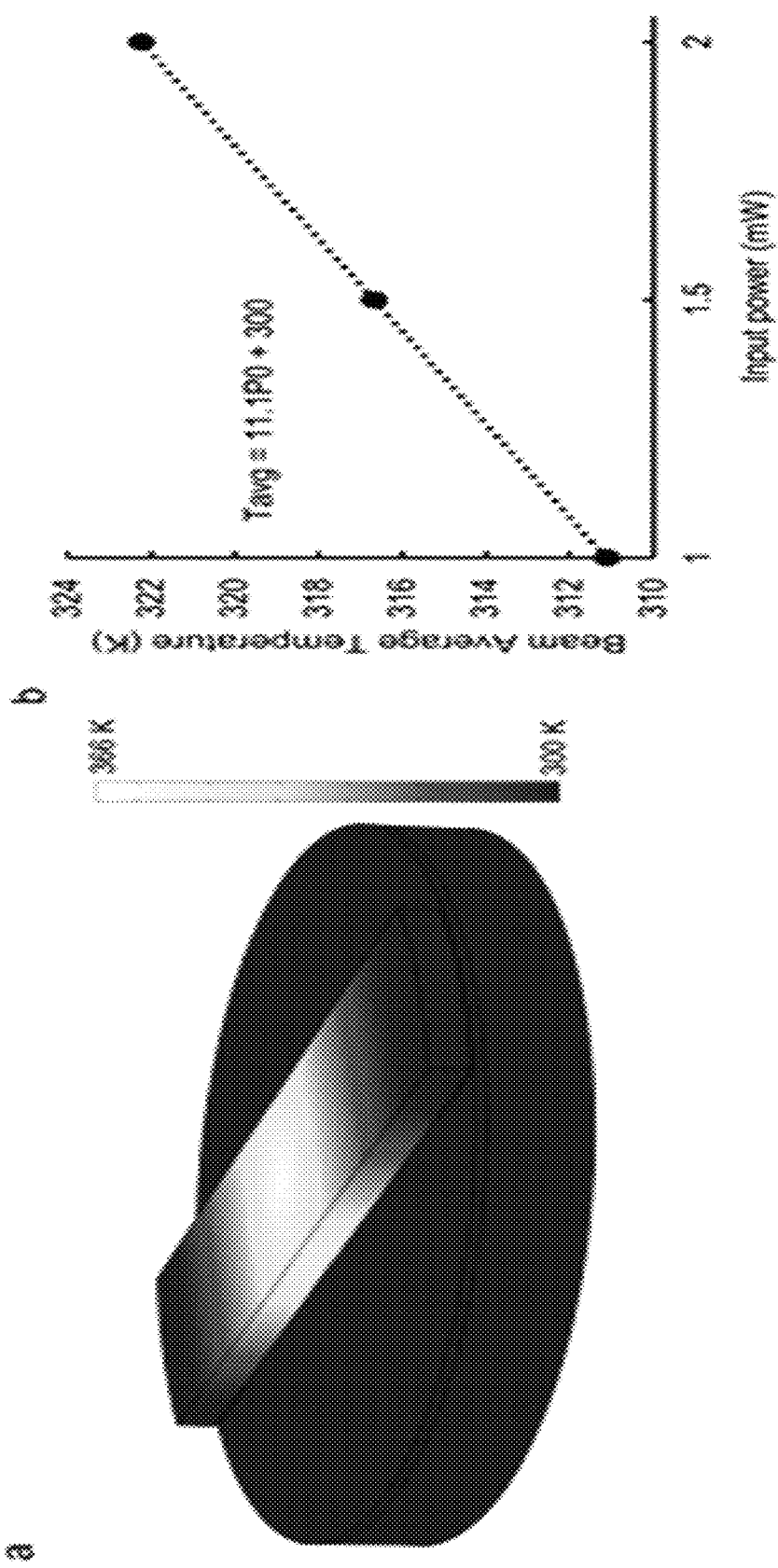
FIG. 19 shows a temperature distribution for a localized gap plasmon resonator in panel A, and a graph of beam average temperature versus input power in panel B.

Absorption of the input probe laser by the NEM member results in a temperature increase of the LGP resonator, which affects the thermal motion of the LGP resonator. To account for this, we calculate the temperature distribution of a 5 µm long, 1.25 µm wide, 175 nm thick nitride beam NEM member with an embedded plasmonic nanoprism and a 15 nm plasmon gap, excited by an incident 0.3 NA Gaussian beam with 1.7 mW input power. One quarter of the geometry is simulated using symmetry conditions, and the model parameters are match the experimental conditions for the motion measurement with a 2 mW input power, of which 85% reaches the LGP resonator through the uncoated glass window on the vacuum chamber. The beam NEM member is connected to a 45 nm thick Au pad atop a 500 nm thick Si substrate by a 500 nm×1250 nm rectangular support serving as a thermal contact between the beam NEM member and substrate. All boundaries are set as thermal insulation with exception of the bottom of the Si substrate, which is set to T=300 K. Panel A of FIG. 19 shows the resulting temperature distribution of the pNEMS device, whereas panel B of FIG. 19 shows the calculated average temperature of the beam.

Example 5. Comparative Experiments

Figure 20:
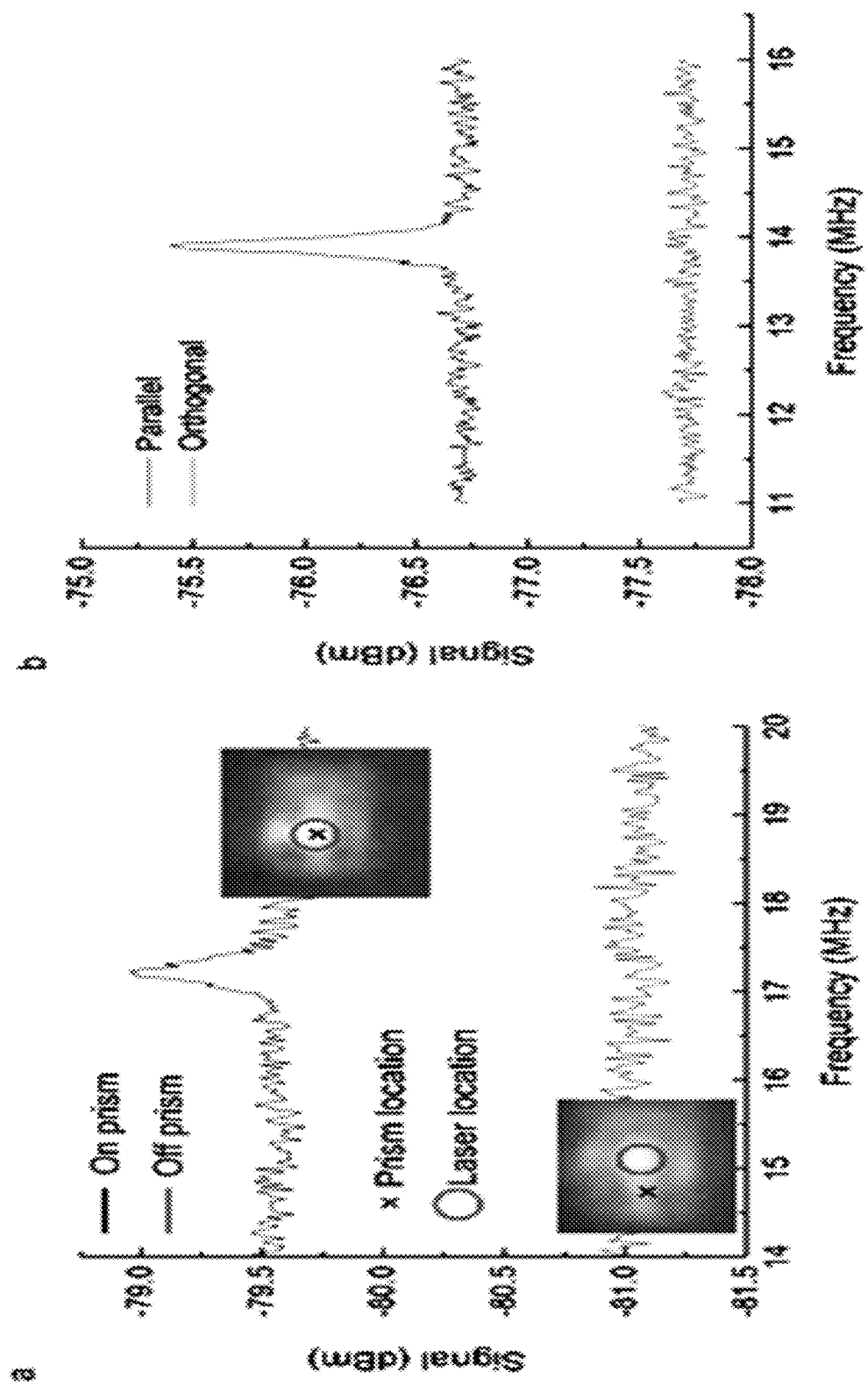
FIG. 20 shows graphs of signal versus frequency.

To confirm that the motion transduction signals are due to the LGPs, two comparative experiments were performed with data shown in FIG. 20.

In a first comparative experiment, the excitation laser is first placed directly over the plasmonic nanoprism dispose on a cantilever NEM member, and then subsequently moved along the cantilever length by 2 µm to a position without a plasmonic nanoprism. The measured motion signal (black curve shown in panel A of FIG. 20) disappears completely once the laser is moved (red curve in panel A of FIG. 20), showing that the plasmonic nanoprism transduces the motion in the LGP resonator. The slight reduction in signal power for the off-plasmonic nanoprism data is caused by non-perfectly parallel translation of the probe laser with respect to the cantilever NEM member long axis, which reduced slightly the overall reflected optical power that is confocally collected.

In a second comparative experiment, the polarization of the excitation source is rotated from a direction parallel to the plasmonic nanoprism length (see black curve in panel B of FIG. 20) to the orthogonal direction (see red curve in panel B of FIG. 20). Elimination of the signal due to polarization rotation shows plasmonic nature of the motion transduction. In this case, the slightly lower signal power for the orthogonal polarization is caused by systematic reductions in the power delivered to the sample through the optical system. Motion transduction is absent for this input polarization upon increasing the input power to 3 mW.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A localized gap plasmon resonator comprising:
   a pad comprising:
      a first plasmonic material to support a surface plasmon; and
      a first plasmon surface;
   a nanoelectromechanical (NEM) member disposed opposing the first plasmon surface of the pad and spaced apart from the pad by a plasmon gap, the plasmon gap supporting a plasmon resonance; and
   a plasmonic nanoprism disposed on the NEM member and comprising:
      a second plasmonic material to support a surface plasmon; and
      a second plasmon surface,
      such that:
         the second plasmon surface of the plasmonic nanoprism opposes the first plasmon surface of the pad;
         the second plasmon surface is parallel to the first plasmon surface;
         a distance that separates the second plasmon surface from the first plasmon surface is a size of the plasmon gap between the second plasmon surface and the first plasmon surface; and
         the pad, the plasmonic nanoprism, and the plasmon gap support a localized gap plasmon (LGP) mode comprising an LGP frequency, an intrinsic optical loss rate, an optical loss rate by radiation, or a combination comprising at least one of the foregoing.

2. The localized gap plasmon resonator of claim 1, further comprising:

a substrate on which the pad and the NEM member are disposed.

3. The localized gap plasmon resonator of claim 2, wherein the NEM member further comprises a beam in mechanical communication with the substrate, and
a plurality of attachment points connects the beam to the substrate, the beam being connected to the substrate at a first end of the beam and a second end of the beam.

4. The localized gap plasmon resonator of claim 3, wherein a number of the attachment points is two.

5. The localized gap plasmon resonator of claim 2, wherein the NEM member further comprises a cantilever in mechanical communication with the substrate, and
an attachment point connects the cantilever to the substrate.

6. The localized gap plasmon resonator of claim 1, further comprising:
a dielectric spacer disposed in the plasmon gap and interposed between the pad and the plasmonic nanoprism.

7. The localized gap plasmon resonator of claim 6, wherein the dielectric spacer comprises a polymer.

8. The localized gap plasmon resonator of claim 6, wherein the dielectric spacer is compliant to the size of the plasmon gap between the second plasmon surface and the first plasmon surface such that a thickness of the dielectric spacer changes in response to a change in the size of the plasmon gap between the second plasmon surface and the first plasmon surface.

9. The localized gap plasmon resonator of claim 1, wherein the first plasmonic material and the second plasmonic material independently comprise gold, silver, aluminum, copper, other metal, metal alloy, heavily doped semiconductor, graphene, other material exhibiting collective oscillations of free charges and/or exhibiting negative real permittivity or a combination comprising at least one of the foregoing plasmonic materials.

10. The localized gap plasmon resonator of claim 9, wherein the first plasmonic material and the second plasmonic material are gold.

11. The localized gap plasmon resonator of claim 1, wherein the plasmonic nanoprism further comprises a cuboid.

12. The localized gap plasmon resonator of claim 11, wherein the cuboid comprises a rectangular nanoprism.

13. The localized gap plasmon resonator of claim 12, wherein the plasmonic nanoprism further comprises a thickness, width, and length that independently are less than or equal to 200 nm.

14. The localized gap plasmon resonator of claim 1, wherein the NEM member comprises an element from group 2, group 3, group 5, group 6, group 10, group 11, group 12, group 13, group 14, group 15, group 16, or a combination comprising at least one of the foregoing elements.

15. The localized gap plasmon resonator of claim 14, wherein the NEM member comprises silicon nitride.

16. The localized gap plasmon resonator of claim 1, wherein the size of the plasmon gap between the second plasmon surface and the first plasmon surface is from 1 nm to 15 nm.

17. The localized gap plasmon resonator of claim 1, wherein the LGP mode changes in response to movement of the NEM member relative to the first plasmon surface of the pad.

18. A process for making the localized gap plasmon resonator of claim 1, the process comprising:
providing a pad layer;
disposing a sacrificial layer on the pad layer;
removing a portion of the sacrificial layer and a portion of the pad layer;
forming the pad from the pad layer, wherein a remaining portion of the sacrificial layer is disposed on the first plasmon surface of the pad;
disposing the plasmonic nanoprism on the sacrificial layer, such that the sacrificial layer is interposed between the second plasmon surface of the plasmonic nanoprism and the first plasmon surface of the pad;
disposing a device layer on the plasmonic nanoprism; and
removing the sacrificial layer interposed between the pad and the plasmonic nanoprism to make the localized gap plasmon resonator of claim 1.

19. The process for making the localized gap plasmon resonator of claim 18, wherein the sacrificial layer is chromium.

* * * * *